United States Patent [19]

Pajtas

[11] Patent Number: 5,676,900
[45] Date of Patent: Oct. 14, 1997

[54] PROCESS FOR MAKING A MULTIPLE NON-PNEUMATIC TIRE

[75] Inventor: Scott Robert Pajtas, Highland, Mich.

[73] Assignee: Michelin Recherche et Technique S.A., Granges-Paccot, Switzerland

[21] Appl. No.: 447,862

[22] Filed: May 23, 1995

Related U.S. Application Data

[60] Division of Ser. No. 159,413, Nov. 29, 1993, Pat. No. 5,460,213, which is a continuation-in-part of Ser. No. 853,371, Mar. 18, 1992, Pat. No. 5,265,659.

[51] Int. Cl.$^6$ .............. B29C 33/12; B29C 33/52
[52] U.S. Cl. .............. 264/251; 264/255; 264/221; 264/317; 264/DIG. 44
[58] Field of Search .............. 264/250, 254, 264/255, 259, 251, 221, 317, DIG. 44, 311; 152/11, 327

[56] References Cited

U.S. PATENT DOCUMENTS

| | | | |
|---|---|---|---|
| 3,415,923 | 12/1968 | Petersen | 264/221 |
| 4,160,007 | 7/1979 | Pizzorno | 264/328.3 |
| 4,201,744 | 5/1980 | Makinson | 264/250 |
| 4,343,757 | 8/1982 | Popplewell | 264/221 |
| 4,379,104 | 4/1983 | Koorevaar | 264/274 |
| 4,464,324 | 8/1984 | Hager | 264/221 |
| 4,514,243 | 4/1985 | Moore, III et al. | 264/248 |
| 5,023,040 | 6/1991 | Gajewski et al. | 264/328.3 |
| 5,173,237 | 12/1992 | Kidd | 264/221 |

Primary Examiner—Angela Ortiz
Attorney, Agent, or Firm—Robert R. Reed; Russell W. Warnock

[57] ABSTRACT

Plural non-pneumatic (NPTs) are unitarily fitted, side-by-side, on a wheel rim, forming a multiple NPT (MNPT) to carry a load by sharing the load between the side-by-side NPTs. By "unitarily" is meant that the NPTs are fitted to the rim as a whole, without cutting or sectioning. With this construction, a MNPT is provided; with characteristics which are surprisingly better than those attributable to a single NPT having the same or a different outer hoop diameter but the same mass of resin as the plural NPTs. The NPTs may be formed as rings, then by heat-distending them, unitarily post-fitted to the surface of an adhesively prepped wheel rim, for operation at relatively low torque; alternatively, and more preferably the NPTs are cast or otherwise thermoformed, as for example by injection molding, onto the wheel rim and self-adhesively autogenously secured, so as to provide the plural NPTs integrally bonded to the wheel rim. Dual spaced-apart NPTs on a wheel rim are unexpectedly advantageous in comparison to a single NPT, designed to carry the same load, irrespective of which of several constructions is used for the NPTs. First, the twin NPTs provide greater stability because the spaced apart twin webs lend far more stability than the single web. Second, the spring rate for a larger NPT having a higher web is lower than the spring rate for either of the dual NPTs. For the dual NPTs, this results in less road noise, a better 'ride' and greater comfort, each of which considerations assume greater significance as speed of the vehicle increases. Third, each of the dual NPTs generates substantially less heat, the difference getting progressively exaggerated as the speed of travel increases. It is easier to dissipate the heat generated by the dual smaller NPTs than it is to dissipate that generated by a single larger NPT of equivalent duty due mainly to the larger surface area presented by the twin NPTs.

6 Claims, 16 Drawing Sheets

PRIOR ART

PRIOR ART

PROCESS FOR MAKING A MULTIPLE NON-PNEUMATIC TIRE

This is a division of patent application Ser. No. 08/159,413 filed on 29 Nov. 1993, now U.S. Pat. No. 5,460,213, which is a continuation in part of Ser. No. 07/853,371 filed 18 Mar. 1992, issued as U.S. Pat. No. 5,265,659.

BACKGROUND OF THE INVENTION

This invention arose from the realization that a wheel of a heavy vehicle is benefits greatly if more than one non-pneumatic tire ("NPT") can be fitted on the wheel's rim to share the load on the wheel. The desirability of providing plural NPTs on a wheel rim was first disclosed in U.S. Pat. No. 4,945,962 to Pajtas titled "Honeycomb Polyurethane Non-Pneumatic Tire with a Single Web on One Side". Only one of the two side-web NPTs (SWNPTs) shown in FIG. 8 could be molded onto the rim at the desired critical spacing which is no more than the width of the SWNPT's outer hoop. The second SWNPT could be releasably molded on a radially expansible mandrel, removed from the mandrel, and cut into two half-circular sections which are then adhesively secured to the outer surface of the wheel rim. A NPT adhesively secured to a wheel rim is reasonably effective only if the wheel rotates slowly on a lightly loaded, slow-moving vehicle. The NPT is debonded in most other instances because of the lack of a unitary hoop around the wheel rim. It was this inability to provide a wheel fitted with a multiple non-pneumatic tire ("MNPT") which comprises two or more integrally formed NPTs without sectioning them, that incited the enquiry which resulted in this invention. A NPT fitted on the outer surface of a non-expansible wheel rim without sectioning the NPT in a plane through its rotational axis, is referred to as being "unitarily fitted".

The acronym "NPT" is used specifically herein to denote any non-pneumatic tire which comprises "crossed-ribs" integrally connected by a single, circumferentially continuous, vertical web member and formed from a castable elastomeric synthetic resin. The "crossed-ribs" and web, extending in an axial plane at right angles to the axis of rotation of the wheel, integrally connect all cast elements of the NPT. Such a construction makes each of the NPTs, under normal operating conditions, non-expansible. By "crossed ribs" I refer to planar rib members which are angularly oriented, and oppositely directed with respect to each other. By "non-expansible" I refer to the outside diameter of a NPT which is fitted on a wheel rim, which outside diameter, measured at the circumference of the NPT, does not get larger when the wheel is rotated, due to the centrifugal forces generated during operation.

Because the web member is integrally formed with inner and outer hoops, the web member maintains the two hoops of a NPT in radially spaced apart relationship. The outer surface of the outer hoop is referred to as the "outer hoop surface" or "tread surface". The outer hoop surface is typically used, after the NPT is unitarily fitted on the circumference of a wheel rim, as the surface upon which a tread of rubber or other elastomeric material is bonded. If a tread is not beneficial, the NPT is used with a treadless ground-contacting surface. The term "tread" is hereafter used to refer specifically to the annulus of elastomer which is bonded to the outer hoop surface, and does not refer to the outer hoop itself.

Each NPT of a MNPT is a load-bearing axial body, and the multiple NPTs together function as a single NPT. A wheel rim which is fitted with at least two NPTs having outer hoops with the same outside diameter, with the web of one NPT in axially (longitudinal axis) spaced apart relationship with respect to the web of the other, is referred to as "a wheel rim with a MNPT." Though a radially outermost end of each web may carry its own hoop(s) and tread, separate from the hoop(s) and tread carried by the web of an adjacent NPT, each NPT necessarily has an outer hoop having the same outer diameter. In an embodiment with two such NPTs, as illustrated in FIG. 2, the MNPT is referred to as having dual NPTs, with three, as having "triple" NPTs, and so on. Alternatively, the two webs of a NPT may share a single continuous or common outer hoop, in which event the MNPT is referred to as a "Siamese" MNPT as illustrated in FIG. 8. Thus it is seen that any MNPT having only two, vertical, axially longitudinally spaced apart webs may be referred to as such, but one may more particularly be distinguished from the other by being referred to as either a dual, a twin, or a Siamese MNPT, depending upon the structure of each, and whether the webs share a common outer hoop. Reference to a "dual" NPT typically infers that one NPT has a different geometry or construction from the other, e.g. one is narrower than the other, though they may share a common outer hoop. Reference to a "twin" MNPT indicates each NPT has the same structure but are separate, that is, each has its own separate outer hoop, and the outer hoop is longitudinally discontinuous. The term "Siamese NPT" is used to denote a twin MNPT in which the NPTs share a common outer hoop, that is, when the outer hoop is longitudinally continuous.

When a Siamese MNPT (SMNPT) having twin NPTs has both NPTs covered with a single continuous or common tread, the SMNPT is referred to as having a common tread; and if a twin MNFT is provided with separate, longitudinally axially spaced apart treads, the MNPT is referred to as having "twin treads".

It will soon be evident from the description of the MNPTs hereinafter, that when two or more NPTs are fixedly disposed adjacent each other, the relative longitudinal spacing at which they are disposed is of paramount importance, not only from the point of view of the performance of the MNPT, but from the ability to cast it in stages. As long as the spacing is greater than one-half the width of an outer hoop, when two separate NPTs (a twin MNPT) have hoops of the same width, the twin MNPT may be cast in stages with conventional molding techniques using a spacer after molding the first NPT, then molding the second NPT and being able to remove the core which forms the second NPT without interfering with the first NPT. However, when the spacing is no more than one-half the width of either hoop, there is no way of removing the core after the second NPT is molded without destroying the integrity of the first NPT molded. When the outer hoop of one NPT is narrower than the other, it will now be evident that the relative spacing must be no more than one-half the width of the narrower outer hoop if the two-stage method of molding the MNPT is to be frustrated. Therefore, when a MNPT is to be cast or otherwise molded with separate spaced apart NPTs, their relative spacing is critical if the core for molding the NPTs is to be removed, which it must be.

In a Siamese MNPT it will be evident that the continuous outer hoop precludes removing a core from between the adjacent NPTs irrespective of their spacing relative to each other.

In those instances where a heavy load is to be carried while improving the "ride" quality of a NPT, an annular elastomeric insert, referred to as a "ride-enhancing insert", "ride insert" or "insert", denoted by "RI" for brevity, is captured within the web, either directly beneath the circumferential center line of the web, or as a laminate within the web in which the radially most distal portion (outer periphery) of the insert extends above the circumferential center line of the web. In either case, the insert circumferentially embraces the outer surface of a wheel rim on which the NPT is mounted. A NPT having a ride insert therein is referred to by the acronym "NPT/RI". Details of a single NPT/RI formed on a wheel rim are set forth in the above-identified parent application.

A wheel carrying a single NPT having a construction comprising "crossed ribs" with outer and inner hoops spaced apart by a web, are known to be highly effective substitutes for a conventional pneumatic tire. Among such wheels is a wheel rim fitted with a single 'rectangular' non-pneumatic tire or "RNPT". A RNPT has a substantially rectangular cross-section (sectioned in an axial plane in which the axis of rotation of the wheel lies). Another wheel rim is fitted with a NPT having a substantially trapezoidal cross-section, referred to as a 'trapezoidal' non-pneumatic tire or "TNPT". Still another wheel rim fitted with a NPT having a single side-web and a honeycomb cross-section, is referred to as a 'side-web' or 'honeycomb' non-pneumatic tire "SWNPT".

The concept of using multiple NPTs to carry a load distributed substantially equally between them derived from the impracticality of "custom-designing" a single new and larger NPT for the task, then designing and constructing a new mold dimensioned to the specifications of the newly designed larger NPT. Under these economical constraints, the idea of using more than one NPT, generated the concept of a MNPT with a wide road-contacting surface ("wide footprint") offering excellent stability, sensitive yet forgiving handling characteristics, and, on rain-drenched road surfaces, the ability to confine and discharge water from between the NPTs, the water being displaced, and its outflow from beneath the tread directed by the tread design of the tread(s) on the MNPT. Mechanical engineering and design considerations, in turn dictated that the outer hoop of each NPT in the MNPT be proximately disposed at a spacing of "$S_e$" relative to that of an adjacent NPT on the circumference of the wheel, and along its axis of rotation, that is, that NPTs be located coaxially, side-by-side at that spacing. At least two adjacent NPTs are required, and preferably no more than four, though only practical considerations limit what is theoretically, an arbitrarily large positive integer, which for special applications. For example, where considerations of "ride" and "handling" do not apply and a central ride-insert can be dispensed with, as in moving a house on a transportable platform having multiple axles and wheels, a wheel rim may carry six NPTs each having a hoop as wide as 10 cm.

In a dual MNPT, when only two, first and second NPTs are used, they may have outer and inner hoops having axial widths (or lengths measured longitudinally axially) which are the same or different, and when different, one outer hoop is narrower than another, provided that all inner hoops cannot each be axially wider than each outer hoop.

In one preferred embodiment, each outer hoop is wider than each inner hoop, as in the TNPT; in another embodiment each outer hoop is the same width as each inner hoop, as in the RNPT or SWNPT; in still another embodiment, one NPT may be a TNPT and the other a RNPT, or any combination of NPTs one with another. When of the same construction (type whether RNPT, TNPT or SWNPT), one NPT may have a wider outer hoop than the other. When of the same type, and each having the same axial widths of outer and inner hoops respectively, each NPT is identical to the other. There is no suggestion in the tire constructing art that such multiple NPTs be used, nor how such a MNPT might or should be made, or why for reasons of heat dissipation of generated energy, it is desirable that such a MNPT should be made and used as a substitute for a single NPT.

For reasons relating to the geometry of each NPT, and the distribution of a load carried by each NPT, it is desirable to space NPTs in a MNPT at a spacing (measured in the axial direction from nearest edge-to-nearest edge of each NPT's outer hoop) which is no more than one-half the width of the outer hoop of an individual NPT, that is edge-to-edge spacing "$S_e$" of outer hoops must be no more than $0.5(W_{oh})$, where $W_{oh}$ is the width of the outer hoop, i.e. $S_e<0.5(W_{oh})$. For separate NPTs, the tread width is the same width as that of the outer hoop.

Alternatively, the spacing may be measured by the spacing $S_w$ between radial planes through the center lines of adjacent webs which spacing $S_w<1.5\times W_{oh}$. When $S_w>1.5 W_{oh}$ the synergy of stability (referred to below) obtained with a MNPT is unexpectedly vitiated. When a MNPT is integrally formed on a wheel rim with adjacent NPTs autogenously bonded thereto, at this designated maximum spacing, and such spacing is obtained with a conventional annular steel spacing core, it is not possible to remove the spacing core after demolding the MNPT without cutting or otherwise destroying the integrity of the NPTs.

However, in those instances where a continuous tread is desired, the outer hoops (and tread) of adjacent NPTs may be continuous (that is, there is no discontinuity in edge-to-edge abutment of adjacent outer hoops) though opposed ribs of the NPTs are spaced apart. Thus in a MNPT having twin, first and second NPTs, the webs of the adjacent first and second NPTs have a common outer hoop. Though each NPT on a wheel rim is identical in construction and design, successive NPTs may be positioned either in identical attitudes on the wheel rim, or in mirror-image relationship if the NPTs are side-web NPTs (honeycombs).

When formed integrally with the wheel rim, opposed nearest edges of adjacent outer hoops (and treads) of the NPTs in a MNPT are most preferably axially spaced apart (axis of rotation is taken to be lateral) no more than a distance $0.5(W_{oh})$ on the circumferential surface of the wheel rim. A "fugitive spacing core" is used to form the MNPT which is cast as a hot viscous liquid around the spacing core. After post-curing and demolding the MNPT, the spacing core is removed.

Though each NPT on a MNPT may be molded from any thermoformable elastomeric resin which when cured provides desirable properties for the purpose at hand, it is preferred to use a flowable resin which can be either cast or injection molded into an appropriate mold cavity. If molded from the preferred polyurethane and conventionally demolded as an individual NPT, that is, as an annular body in which the inner hoop is not bonded to a wheel rim, it has unexpectedly been found that the inner hoop is radially extensible if it is heated to just under, preferably from 1° C. to 5° C. below, the elastomer's initial glass transition temperature Tg, making it possible to force a hot, distended NPT over a wheel rim, though the NPT suffers distortion. More surprising is that, upon cooling, the inevitably distorted NPT substantially regains its original dimensions. This finding allows a hot NPT to be heat-expanded just enough to be "stretch-fitted" over the outer surface of a cool wheel rim. The NPT is heated to just below its Tg and while hot, forced over the circumferential outer surface of the wheel rim, and allowed to cool. Upon cooling, except for the strength of the bond between the inner hoop and the wheel rim's surface, the wheel rim with the stretch-fitted NPT is essentially indistinguishable from a wheel rim upon which the NPT is directly, integrally molded.

Whether each NPT is integrally stretch-fitted onto the wheel rim, or molded upon it, the surface of the wheel rim is preferably prepped with an appropriate adhesive. NPTs which are stretch-fitted on a wheel rim provide excellent service in low-torque applications, for example on luggage carts, grocery carts and the like.

Alternatively, each NPT may be diametrically sectioned, preferably with a sharp cutting means, in a plane containing the axis of rotation of the wheel, and the half-sections reassembled and adhesively secured to the rim's outer surface, to reconstruct the NPT. As in the immediately preceding embodiment, a MNPT with such post-fitted NPTs will be adequate for service applications where the driving torque on the wheel is insufficient to separate the post-fitted NPT from the wheel rim.

For other applications, where the driving torque is too high for the bond between post-fitted NPT and wheel rim, it is fitted with a MNPT integrally formed on the circumference of the rim and fixedly, non-rotatably secured by being autogenously adhesively bonded thereto, optionally with the aid of an adhesive, as described hereafter. By "autogenously bonded" is meant that an adhesive bond is automatically formed when molten polymer is cooled in contact with the wheel's surface.

Individual such NPTs with crossed ribs may be cast and molded as described in U.S. Pat. No. 4,784,201 to Palinkas and Nybakken, titled "Non-Pneumatic Tire with Vibration Reducing Features"; U.S. Pat. No. 4,832,098 to Palinkas and Page, rifled "Non-pneumatic Tire with Supporting and Cushioning Means"; U.S. Pat. No. 4,921,029 titled "Trapezoidal Non-Pneumatic Tire with Supporting and Cushioning Means" to Palinkas and Pajtas; U.S. Pat. No. 4,934,425 to Gajewski et al titled "Non-Pneumatic Tire"; U.S. Pat. No. 5,023,040 to Gajewski et al titled "Method for Making a Polyurethane Non-Pneumatic Tire"; U.S. Pat. No. 4,945,962 to Pajtas titled "Honeycomb Polyurethane Non-Pneumatic Tire with a Single Web on One Side"; and, Japanese patent appln. Heisei 2-179503 to Hirayama, the disclosures of each of which is incorporated by reference thereto as if fully set forth herein.

An NPT may be formed from any castable synthetic resinous material, most preferably an elastomeric resin having specified desirable properties which provide optimum handling, cornering, and load bearing characteristics depending upon the contemplated dynamic conditions under which a vehicle fitted with the NPTs, is to perform. By "elastomeric synthetic resinous material" I refer to a stiff, resilient material, not an isoprene natural "NR" or styrene-butadiene robber SBR, which resilient material has specific characteristics defined hereinafter. Rubber, whether natural or synthetic and blends thereof, no matter how blended or vulcanized, is not an elastomer usable for making a NPT as defined herein, as it fails to meet the criteria for a NPT.

A RNPT provides excellent overall support and stability when used on relatively slow-moving (under 50 miles per hour, or 80 kilometers per hour) motorized vehicles of all kinds which are not routinely subjected to high lateral acceleration. Examples of such vehicles are fork-lift trucks, golf carts and motorized luggage carts and wheelbarrows. Where high lateral acceleration is routinely experienced, a TNPT is more desirable. When neither a RNPT or a TNPT provides the desired performance under dynamic conditions, a SWNPT may be used, particularly where a large "footprint" is required because of an over-sized load to be carried. And where specific load bearing and handling characteristics are required under designated road conditions in a specified speed range, it may be desirable to mix and match one NPT with one or more other NPTs which may be the same or different in all respects except the diameter of the outer hoop.

Details of the TNPT are disclosed in the aforementioned '029 patent to Palinkas and Pajtas; and, details of the SWNPT are disclosed in the foregoing '962 patent to Pajtas, the disclosures of both of which patents are incorporated by reference thereto as if fully set forth therein.

As described in the foregoing and related NPT patents, however, since they teach that a desired NPT is to be configured for a predetermined load-bearing capacity by adequately dimensioning the web, crossed ribs, inner and outer hoops, etc., there is no suggestion that any large load be carried by more than one NPT mounted on the same wheel rim, nor is there any indication how multiple NPTs could or should be provided on a single wheel rim. Further, since each most preferred prior art NPT is integrally bonded to the wheel rim, by being cast onto it, it would not occur to one skilled in the art to make a wheel to carry multiple NPTs, nor would it be obvious how to do so.

The need for MNPTs on a wheel rim arose from considerations peculiarly interwoven with the function and construction of wheels fitted with a NPT. Since the load to be carried determines the physical dimensions of the NPT, one would be required to design and construct a "bigger" NPT having scaled-up dimensions, to carry a larger load than that carried by a "smaller" NPT. However, the dimensions of the "bigger" NPT require a larger mold than one used to cast the smaller NPT and the production cost of the larger NPT increases dramatically because with increasing size, it becomes increasingly difficult to control the quality of the casting.

In view of the foregoing considerations it was fortuitous to find that one can avoid manufacturing such a "bigger" NPT if one can distribute the same large load over more than one smaller NPT on each wheel. The economic advantage is that an MNPT fitted with high quality NPTs to carry any desired load may be provided on a wheel rim of standard diameter, with a minimum of scrap.

SUMMARY OF THE INVENTION

It has been discovered that plural NPTs may be unitarily fitted, side-by-side, on a wheel rim, forming a MNPT to carry a load by sharing the load between the NPTs; and, that a MNPT may be provided with characteristics which are surprisingly better than those attributable to a single NPT having the same or different outer hoop diameter and the same mass of resin as the plural NPTs. The NPTs may be formed as rings, then by heat-distending them, unitarily post-fitted to the surface of an adhesively prepped wheel rim, for operation at relatively low torque; alternatively, and more preferably the NPTs are cast or otherwise thermoformed, as for example by injection molding, onto the wheel rim and self-adhesively autogenously secured, so as to provide the plural NPTs integrally bonded to the wheel rim.

It has further been discovered that dual spaced apart NPTs on a wheel rim are unexpectedly advantageous in comparison to a single NPT, designed to carry the same load, irrespective of which of the NPTs is used as the design basis, for several reasons. First, the twin NPTs provide greater stability because the spaced apart twin webs lend far more stability than the single web. This is a particularly desirable feature for the wheels of a fork-lift truck which must routinely lift heavy loads 6 meters or more above the ground. Second, the spring rate for a larger NPT having a higher web is lower than the spring rate for either of the dual NPTs. For the dual NPTs, this results in less road noise, a better 'ride' and greater comfort, each of which considerations assume greater significance as speed of the vehicle increases. Third, each of the dual NPTs generates substantially less heat, the difference getting progressively exaggerated as the speed of travel increases. Moreover, it is easier to dissipate the heat generated by the dual smaller NPTs than it is to dissipate that generated by the single larger NPT due mainly to the larger surface area presented by the twin NPTs. Thus, it was surprising to find that, despite leaving out the costs for designing and constructing a new larger mold for the larger NPT, and notwithstanding the saving in material, which saving would accrue to the extent of about 20% in favor of the single larger NPT, such saving fell far short of providing a sufficient justification to give up the foregoing advantages of the dual NPTs.

The foregoing is even more evident when the dual NPTs used are twin essentially identical NPTs and the comparison is with a single larger NPT, having a duty (to carry the same load) equivalent to that of the combined twins, and the single NPT is deliberately designed to have an analogous structural configuration and the same mass as the NPTs.

It is therefore a general object of this invention to provide multiple NPTs in side-by-side relation, preferably, each of identical construction and dimensions, axially spaced apart on the circumference of a wheel rim at an edge-to-edge (nearest edge) spacing $S_e$ which is no more than the width (axial length) of an outer hoop of the NPT, and more preferably, no more than one-half the width of either outer hoop, if each is of the same width, and more than than one-half the width of the narrower outer hoop when one outer hoop is wider than the other. The spacing may also be measured as being no more than $S_w$, the spacing between the central radial planes through the centerlines of webs of adjacent NPTs whether they are formed with a continuous or discontinuous common outer hoop, a continuous or discontinuous common inner hoop, or any combination of the foregoing. Most preferred is the combination of a discontinuous outer hoop and a discontinuous inner hoop.

It is another general object of this invention to provide the aforesaid spaced apart NPTs on a wheel rim by casting a synthetic resinous elastomer around a "fugitive spacing core", or "spacing core" for brevity, which spacing core is configured to provide the aforesaid preselected spacing between adjacent NPTs, whether the NPTs are molded with a common outer hoop of cured elastomer, or with discontinuous, spaced-apart outer hoops. The material of the spacing core ('core material') must be inert relative to the polymer being cast, and the material and polymer be mutually insoluble. Preferably the core material forms a substantially smooth-surfaced solid, but it is critical that the core remain solid above a temperature at which liquid elastomer is introduced into the molding cavity, and at least partially cured sufficiently to maintain the cast shape of the liquid polymer; and, the spacing core being essentially inert and insoluble in the elastomer is removably bonded thereto.

By a "fugitive spacing core" we refer to a molding core of a core material having a melting point (if the material is crystalline) or Tg (if the material is elastomeric) around which hot liquid elastomer is cast, allowed to cool and cure, then, the molding core having fulfilled its function, the MNPT is either heated or solvent extracted to remove the fugitive core. Typically, the cast elastomer is cured to a firm solid mass at a first curing temperature no higher than the temperature of the liquid polymer, and preferably at a temperature lower than about 60° C.; the firm solid is then post-cured at a temperature high enough to melt the core material but not high enough to adversely affect the curing of the liquid polymer and the properties of the resulting cured elastomer. The core material is removed as described hereinafter, the method of removal depending upon the core material and the curing temperature of the elastomer used to make the NPT (referred to as the "NPT elastomer"). In the particular instance where the core material is a friable foam, it is pulverized within the cured NPT, then either allowed to remain within the NPT, or is removed.

This invention provides a tire and wheel rim assembly rotatable about an axis, comprising at least two, preferably identical elastomeric non-pneumatic tires, positioned either in identical attitudes, or in mirror-image relationship, side-by-side on the circumferential outer surface of the wheel rim, each tire having an outer and an inner hoop connected in radially spaced-apart relationship by a web with an upper and a lower portion, and oppositely directed angulated ribs intersecting said web on only one side, or on either side thereof, wherein at least the lower portion of the web lies in a circumferential plane at right angles to the axis of rotation of the tire.

More particularly, a MNPT for use as a spare tire for an automobile or truck is disclosed in which each NPT has a central web in which an elastomeric member or ride-insert is captured. The ride-insert is disposed in the circumferential plane overlying the wheel on which the NPTs are mounted, and integral with the web, the ride-insert occupying less than 50% of the area of the inner hoop, and extending radially through less than one-half the height of the web.

An effective and simple method is provided for manufacturing a MNPT comprising, securing a fugitive spacing core non-rotatably in a preselected position on the outer circumferential surface of a wheel rim to provide a 'prepped' wheel rim;

positioning the prepped wheel rim in a molding zone in which a molding cavity is dimensioned to provide multiple, but more preferably, dual non-pneumatic tires which may be the same or different, each tire having a radially extending web, each web connecting radially spaced-apart inner and outer hoops between which are disposed a multiplicity of obliquely angulated crossed ribs;

introducing a moldable elastomeric resin into the molding cavity until a filled mold cavity is obtained;

maintaining the filled mold cavity at an elevated temperature sufficiently high to cure the resin to a firm solid mass, but below a temperature deleterious to the resin within a chosen interval of time so as to form the MNPT having dual, spaced-apart, axial bodies separated by the spacing core, all supported on the wheel rim;

removing the MNPT from the molding zone after the interval of time; and, removing the spacing core from between the cured NPTs without destroying their integrity.

Preferably the process includes post-curing the MNPT at an elevated temperature and for enough time to provide desired properties in the post-cured elastomer. The precise sequence of operations for removing the spacing core are not narrowly critical and depend largely upon the choice of elastomer and of the material for the spacing core as will be explained in greater detail in the following detailed description.

BRIEF DESCRIPTION OF THE DRAWINGS

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Figure 1:
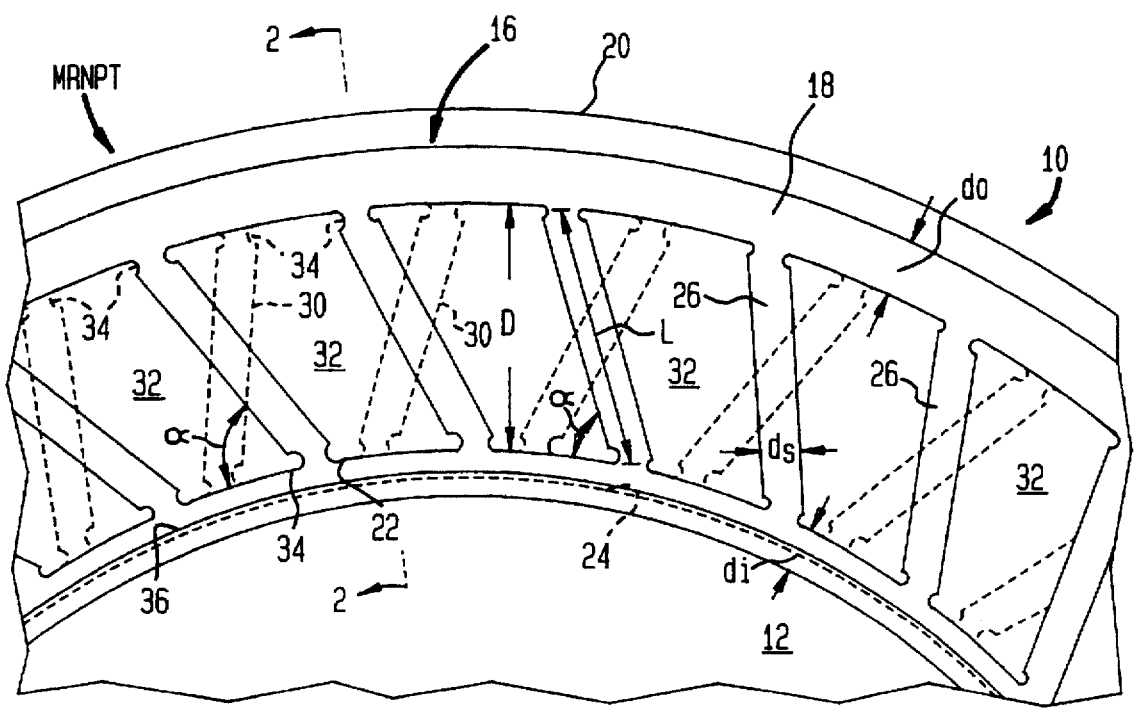
FIG. 1 is a side elevational view illustrating a broken-away portion of a wheel rim fitted with twin longitudinally aligned NPTs to form a twin MNPT. By "longitudinally aligned" is meant that the front ribs 26 of the front NPT overlap the front ribs of the rear NPT (which front ribs of the rear NPT are not visible because they are directly behind the front ribs of the front NPT).

As stated above, a NPT in the MNPT may be rectangular, trapezoidal or honeycomb in cross-section, but always has a web in which at least the lower half is vertical, whether the web is a central vertical web (for the RNPT and TNPT), or a side vertical web (in the SWNPT). The choice of elastomer from which each NPT of a MNPT is molded depends upon the end-use of the MNPT. Most preferred is a non-crystalline or amorphous resin which is fluidizable at above its $T_g$, but a semi-crystalline elastomeric resin may also be used. A semi-crystalline resin exhibits a $T_g$ in much the same manner as a non-crystalline resin, but the semi-crystalline resin also exhibits a melting point, usually well above its $T_g$. Whichever moldable elastomeric resin is used, it must be fluidizable so that it can be introduced into the molding cavities which will form the NPTs on the wheel rim.

For vehicle use, each NPT typically includes a road-surface contacting tread designed to provide the MNPT with better road-holding and handling characteristics. Such a tread is preferably made of a synthetic or natural rubber, essentially of the same type as used for pneumatic automobile tires. The tread is preferably adhesively secured to the circumferential surface of the outer hoop. An alternative is to secure the tread to the hoop with fastening means such as rivets. In each of case, each NPT typically has its own tread, but as described below, a continuous tread may be provided in a Siamese MNPT. For applications where a tread is unnecessary, as for example, on appliances, compressors, drill presses and the like, which are frequently moved from one location to another, the outer hoops of the MNPT provide adequate traction.

For some applications, the outer hoop of each NPT of the aforementioned MNPT, whether of a multiple TNPT ("MTNPT"), multiple RNPT ("MRNPT"), multiple SWNPT ("MSWNPT"), or combination of one with at least one other, may be a single continuous outer hoop, integrally formed as such in the mold, rather than hoops on separate NPTs. Since it is self-evident that each outer hoop of a NPT must be circumferentially continuous, the term "axially continuous outer hoop" as used in relation to a MNPT, relates to the continuity of the hoop along the longitudinal axis, and connotes the same function of the common outer hoop on plural NPTs as that of a single outer hoop on a single NPT. Thus the axially continuous outer hoop for such a MNPT is a relatively wide cylindrical hoop, equal in width (measured along the longitudinal axis) to the combined width of each hoop on each NPT, had the NPTs been separate, and the spacing between the nearest opposed edges of adjacent outer hoops. As in a single NPT, the opposed ribs of the adjacent NPTs of a MNPT are in longitudinally axially spaced-apart relationship. Since there is no through-passage to the exterior of the outer hoop from between the adjacent two or more NPTs of a MNPT with a continuous outer hoop, it is immediately evident that, if the fugitive core used to form the MNPT is to be discharged, the discharge must be effected through passages in the rim of the wheel.

Referring to FIG. 1 there is shown an elevational view, with portions broken away, of twin identical RNPTs 16, with corresponding elements of each aligned in a direction normal to the plane of the paper. The RNPTs 16, together identified as MRNPT, are mounted on a wheel rim 12 of a wheel indicated generally by 10, including the foremost of twin RNPTs 16 of the MRNPT. The RNPTs are molded from an elastomeric polymer the specifications for which are set forth in the '962 patent. Most preferred is a polyurethane (PU) such as Adiprene available from Uniroyal Chemical Corp., because its physical properties provide the defined structure with its intended function and results in acceptable performance. Other commercially available elastomers are segmented copolyesters such as Hytrel 5556 from DuPont, and block copolymers of nylon such as Nyrim from Monsanto Chemical Co.

Each RNPT comprises inner and outer hoops 22 and 18 respectively which are circular bands, much wider (that is, longer, in the axial direction) than they are thick (measured in the radial direction). The inner surface of the inner hoop 22 is securely mounted on the rim of wheel 10 so that the RNPT, preferably with a tread 20, may be used much the same way as a conventional pneumatic tire. Most preferably, the inner hoop 22 is bonded to the rim, either by the adhesive strength of the elastomer (e.g. polyurethane), or with an additional adhesive, so that mechanical fastening of the RNPT to the rim is unnecessary.

Between the hoops are planar first ribs 26 (referred to as a front set) and additional second ribs 30 (shown in dotted outline) which constitute a rear set, forming a one-piece structure, so referred to because the from and rear sets of ribs are integrally connected by web 32 having a thickness $d_w$. The web also connects the outer and inner hoops 18 and 22 having thicknesses (radial direction) $d_o$ and $d_i$ respectively, radially spaced apart by hoop spacing D. The term "integrally" refers to the NPT being formed as a whole, the inner and outer hoops, the web and the ribs being formed as a unitary construction of elastomer. The term "unitary" describes the interaction of the component structural elements as a unit. The terms together emphasize the molding or casting of the inner and outer hoops, the web and the ribs as a single construction using the elastomer, and the coaction of these structural elements of the NPT to discharge its stated functions.

The ribs 30 are of equal length L and oppositely directed to ribs 26, but at the same angle α, for convenience in the molding of the NPT, though both the lengths L and the angulation of the ribs may be different as long as they are oppositely directed. When oppositely directed, it is preferred that a front rib 26 cross at least one rear rib 30, resulting in a "crossed" rib structure for optimum stiffness and load-carrying ability. The ribs 26 having a thickness $d_r$ measured in a direction perpendicular to its length (measured along the axis), and an end-to-end length L in the angular direction, are preferably undercut at 34, as shown, where their ends meet the inner and outer hoops 22 and 18 respectively, to enhance flexibility of the connection, thus facilitating compression of the ribs 26 and 30 without bending as each portion of the circumference of the NPT contacts the ground while the vehicle on which the NPT is mounted travels over the ground.

Figure 2:
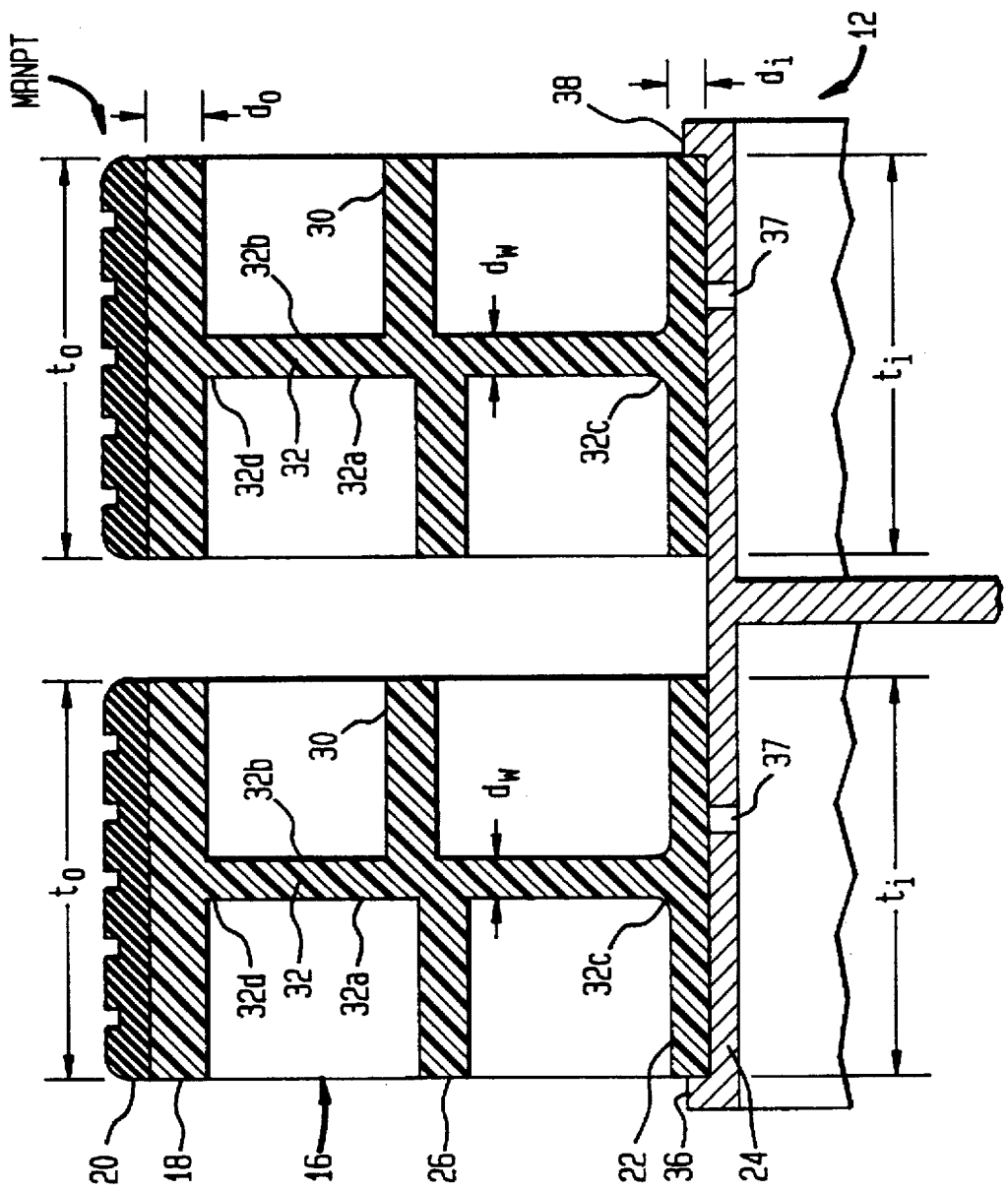
FIG. 2 is an end elevational cross-sectional view in the plane 2—2 in FIG. 1, illustrating a twin MNPT having two RNPTs (R=rectangular) on a wheel rim, with a spacing $S_w$ defined as above. Each RNPT is separate, that is, without a common outer hoop. This "multiple RNPT" (MRNPT) looks the same whether integrally formed or post-fitted.

Referring now to FIG. 2, there is shown twin separate inboard and outboard RNPTs mounted on wheel rim 24, with the distal edges (from the circumferential center line) of each against the inner and outer projections 36 and 38 to confine the inner hoops 22 of each RNPT. The web 32 has a thickness $d_w$, is positioned midway between the axial ends of the inner and outer hoops 18 and 22, and is connected at its (the web's) inner periphery 32c to the inner hoop 22, and at its outer periphery 32d to outer hoop 18, so that the edge of rib 26 lies along one side face 32a of the web. All the first ribs 26 (front set) are similarly connected, so that all ribs are angled at angle α (see FIG. 1) in the same direction. In an analogous manner, all the second ribs 30 (rear set) are connected at their corresponding inner and outer ends to the inner and outer hoops and their edges lie along the face 32b of the web, so that all the fibs 26 and 30 are angled at substantially equal angles α, but the first ribs are directed oppositely to the second ribs.

If desired, each RNPT of the MRNPT may be provided with a rubber tread 20 secured to the outer circumferential surface of the outer hoop 18. The web 32 tends to prevent the ribs from deforming by being bent along L, but allows compressive deformation of the NPT in the area around the point of contact with the ground. The ribs, in turn, prevent the web from buckling in the axial direction until a critical pressure $P_{cr}$ is reached, so that the web and crossed ribs cooperate to carry the load. Changing the angle α of the ribs effectively varies the spring rate without changing the dimensions of the structural components of the NPT, or the composition of the elastomer from which it is molded. Through bores 37 are provided in the wheel rim 24 to allow air to be pumped through the bores for enhanced cooling of the NPTs particularly when the NPTs are provided with a common outer hoop, as in the Siamese SMRNPT illustrated in FIG. 8.

The ability of any MNPT to be deformed, yet return to its cylindrical shape, essentially instantaneously under compression and sudden transitions of loading, requires that the NPT withstand a maximum strain of 20% during normal operation over its useful life, yet buckle locally to absorb the sudden impact of a projecting object, or road surface irregularity. It is this ability derived from the unique coaction of NPTs which gives the MNPT desired handling and ride characteristics. The particular design of the essential deformability and buckling characteristics of the NPT depends upon the particular duty chosen for the MNPT.

Figure 1A:
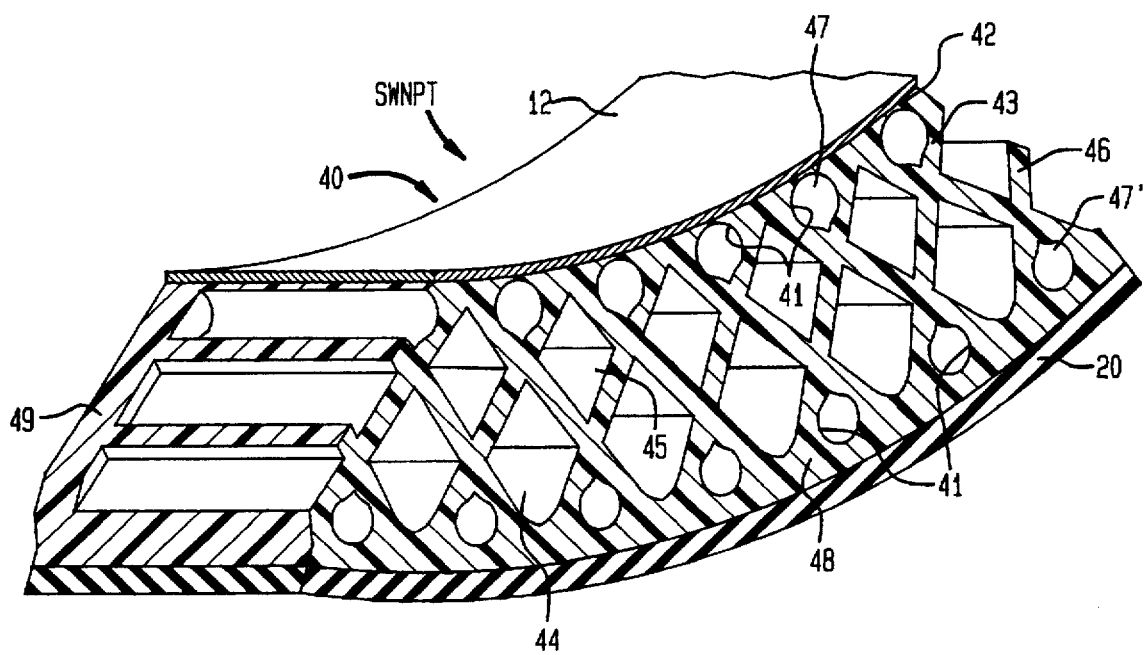
FIG. 1A is a perspective view (viewed from the inboard side of a wheel mounted on an automobile) of a broken-away portion of one-half of the MSWNPT mounted on the rim of a wheel, sectioned in a mid-circumferential central but angular plane in relation to the rotational axis of the wheel rim. Twin side-web NPTs (SWNPTs) are mounted on the rim in longitudinally spaced apart relationship, and the side-web of each NPT is next to each opposed outside edge of the wheel rim. Shown are ribs crossed by intersecting each other along their entire widths (lengths in the axial direction). The outer surface of the SWNPT is covered with a tread. The spacing $S_w$ between the SWNPTs is less than one-half the width of the outer hoop, or the tread width, when the hoop is covered with its own separate tread.

In the embodiment schematically illustrated in FIG. 1A, the SWNPTs are mounted in mirror-image relationship, the web of each being next to the inboard and outboard edges of the wheel rim. Each SWNPT is referred to as being "planar" SWNPT because a cross-sectional view of the side-web shows it (the web) has parallel, vertical, inboard and outboard surfaces. The SWNPT is referred to as being "rectangular" when it presents a vertical visual profile of a planar web, a vertical line (at the open ends of the ribs), and, first and second horizontal lines at the outer surfaces of the outer and inner hoops respectively, so that the general shape of the periphery of the cross-section of elastomer is a rectangle. In other embodiments, the web may be angled, and the SWNPT may be wedge-shaped. Details of these embodiments are set forth in the '962 patent.

Figure 4:
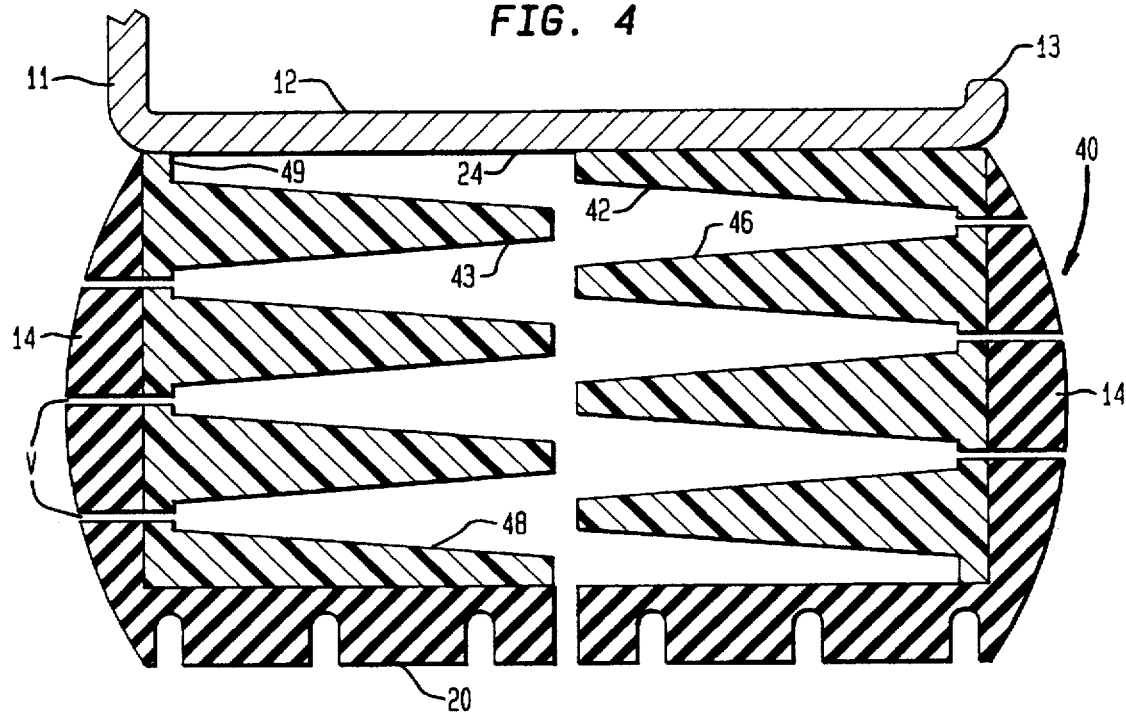
FIG. 4 is an end elevational view illustrating a twin MNPT, shown sectioned in a radial plane in FIG. 1A, having two side-web NPTs (SWNPTs) on a wheel rim in mirror-image relationship with a spacing of less than one-half the tread width. Each SWNPT is separate, that is, without a common outer hoop. Again, this view looks the same whether integrally formed or post-fitted.

In the SWNPT indicated generally by reference numeral 40 and shown as a half-section of a MSWNPT in FIG. 1A, the MSWNPT has twin rectangular SWNPTs as illustrated in FIG. 4 mounted on the outer surface 24 of wheel rim 12 between a disc 11 of the wheel, and its turned up end 13. The outer hoop 48 is radially spaced apart from the inner hoop 42 by a plurality of circumferentially spaced-apart oppositely directed and crossed planar first and second ribs, 43 and 46 respectively; and, a single side-web 49, all of which are formed as a unitary construction. The single side-web 49 connects the inner and outer hoops at their ends, that is, along the outer edges in a plane normal to the rotational axis of the SWNPT, so that, if there were no ribs, the shape would be that of a U channel (lying on its one side) formed into a circle, the inner flange being substantially the same width, or narrower than the outer.

The ribs extend as first and second sets of ribs, on each side of the central vertical mid-circumferential plane of the MSWNPT, the first set of each SWNPT being angled in the range from about 15° to 75° to the radial planes which intersect the ribs in one direction, and the second set angled in the same range but in the opposite direction. Preferably, the ribs are oppositely directed at equal angles in the range from about 30° to 60° so that the ribs form a honeycomb structure with longitudinal passages 44 and 45 open at one end, but closed on the other side by the single side-web. In this construction, passages 44 or 45 in at least one row of the honeycomb structure are longitudinal cells having a cross-section shaped substantially like a quadrilateral. Still other passages 47 and 47' near the inner and outer hoops respectively are more circular than quadrilateral. The ribs 43 and 46 are preferably undercut where their ends connect, as shown at 41, to the inner and outer hoops, to enhance flexibility of the connections.

As in the MRNPT herebefore, it is preferred to provide a MSWNPT with a rubber tread 20 for the usual and self-evident reasons. In operation, the penalty for the excellent comfort and handling afforded by the wide "footprint" of the MSWNPT is that it generates a great deal of heat which must be dissipated. This is done by providing escape vents V in the sidewalls 49. Mainly for cosmetics, the sidewalls are covered with "caps" 14 which simulate the sidewall of a standard pneumatic tire, and through-bores are provided in the caps which place the vents V in open communication with the ambient atmosphere.

Figure 3:
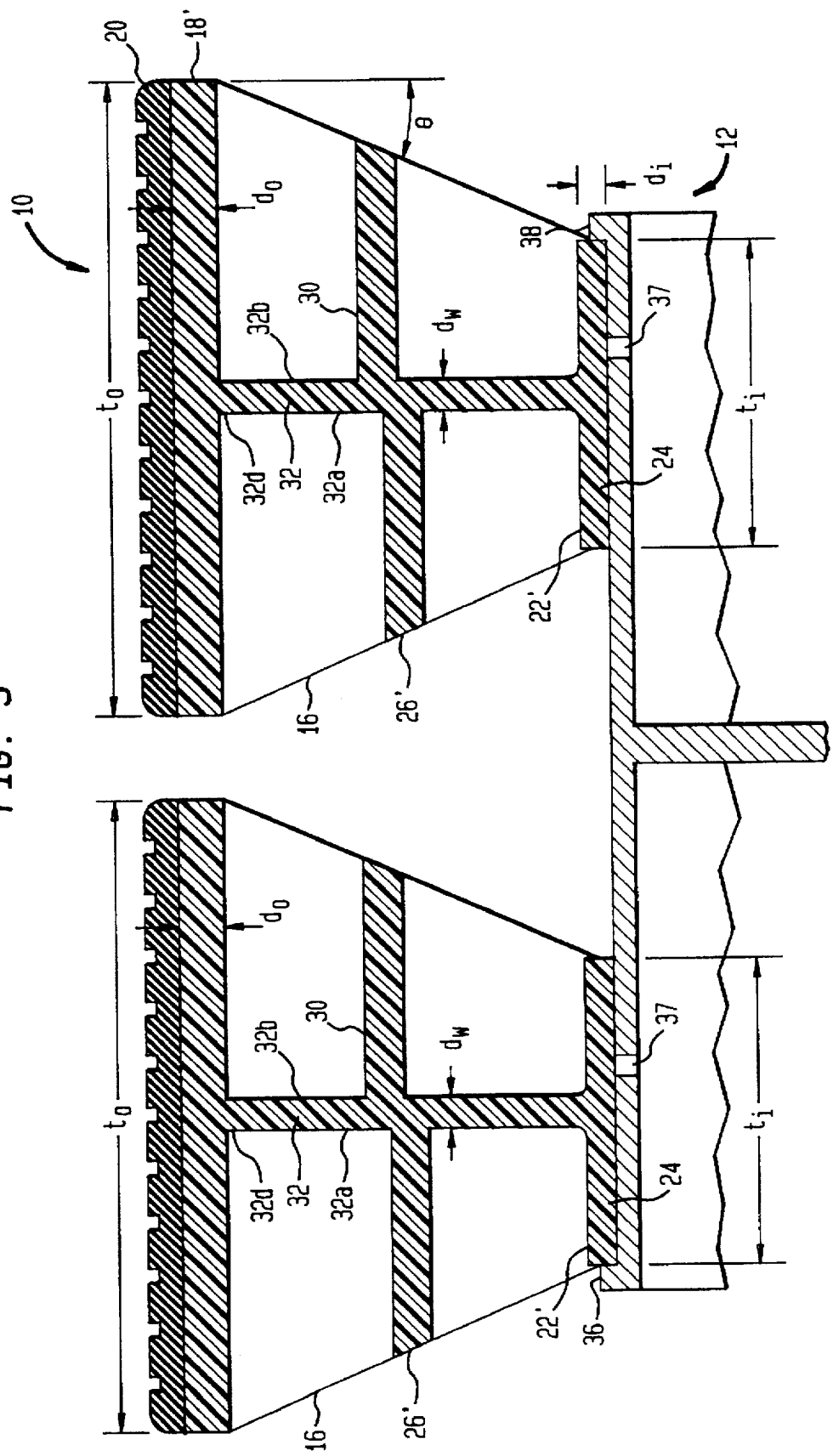
FIG. 3 is an end elevational view illustrating a twin MNPT having two trapezoidal NPTs (TNPTs) (T=trapezoidal) on a wheel rim, with a spacing of less than one-half the tread width. Each TNPT is separate, that is, without a common outer hoop. This "multiple TNPT" (MTNPT) also looks the same whether integrally formed or post-fitted.

Referring now to FIG. 3, there is shown an elevational cross-sectional view of a MNPT comprising twin trapezoidal NPTs (TNPTs), together identified as a MTNPT. As in the RNPT described hereinabove, the outer hoop 18 of each TNPT is typically provided with a rubber tread on the hoop's outer surface. The inner hoop 22' is coaxial but not coextensive with the outer hoop, the net result being that the ribs are outwardly flared (relative to a vertical central plane through the web) as seen in FIG. 3, because the ribs are continuously angled outwardly from the inner hoop to the outer hoop. The same result, namely outwardly flaring ribs, may be produced with ribs flaring outwardly at angle Θ in an angulated plane, even if the ribs terminate in one or more short vertical segments.

In a construction analogous to that of the RNPT, the outer hoop 18 is spaced apart from the inner hoop 22 by front and rear sets of a plurality of circumferentially spaced-apart planar ribs 26' and 30', and a single central planar web 32, all of which are formed as a unitary construction. Single web 32 connects the inner and outer hoops at their inner ends, that is, along the circumferential centerline of the TNPT, so that, if there were no ribs, the shape would be that of an I beam formed into a circle, the inner flange being narrower than the outer flange.

The ribs extend as front and rear sets of ribs, on either side of the single web, the front set angled in the range from about 15° to 75° to the radial planes which intersect the ribs in one direction, the rear set angled in the same range, preferably at the same angle as the front set, but in the opposite direction. Preferably, the ribs are oppositely directed at an angle in the range from 30°–60°.

Figure 5:
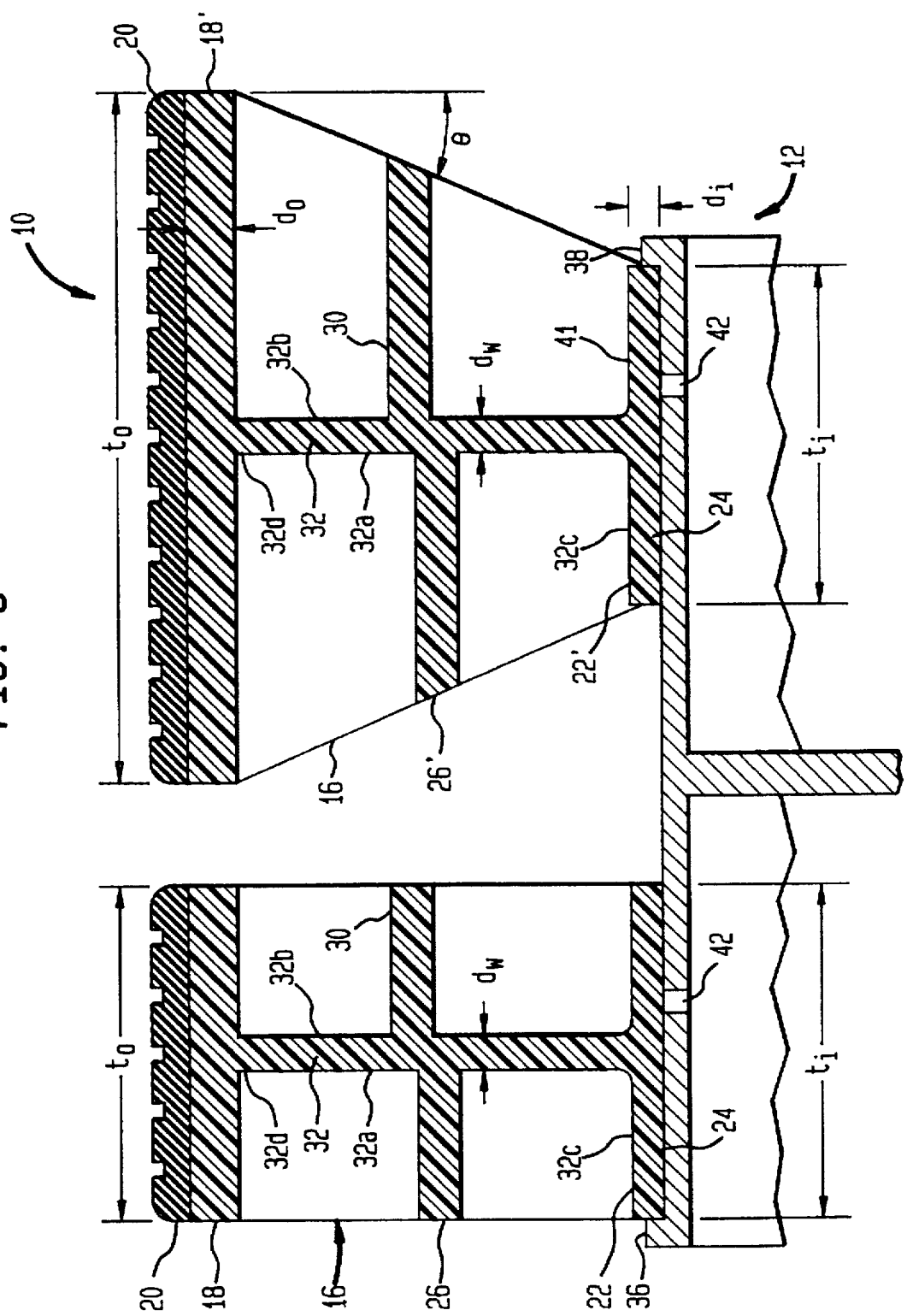
FIG. 5 is an end elevational view illustrating a dual MNPT with two NPTs, one of which is a RNPT and the other a TNPT.

It will now be apparent that, depending upon the chosen service for which the MNPT is to be designed, the best configuration for the MNPT may not be any one of the "twins" described hereinabove, but a combination of one NPT with another, e.g. a combination of a RNPT and a TNPT, as illustrated in FIG. 5, in which the structural elements and their coaction is the same as that described for each RNPT and TNPT in FIGS. 2 and 3 respectively. Such a construction affords one skilled in the art the design flexibility to favor one side of the MNPT over the other, or to provide better distribution of the load under conditions where the load would favor one construction over the other.

FIG. 4 illustrates a twin MSWNPT in which a pair of identical SWNPTS are molded onto the wheel rim 12 in mirror-image relationship with one another, and with the sidewalls on opposed sides of the vertical mid-circumferential plane through the wheel rim, in other words, on the inboard and outboard sides, respectively.

FIG. 5 illustrates a twin MNPT in which the combination used is a RNPT with a TNPT, it being understood that the separate treads 20 of each NPT are coplanar in the footprint of the MNPT. The TNPT may be positioned on either the inboard or the outboard side of the wheel rim, depending upon the handling characteristics desired, and the conditions under which they are to be met.

Figure 6:
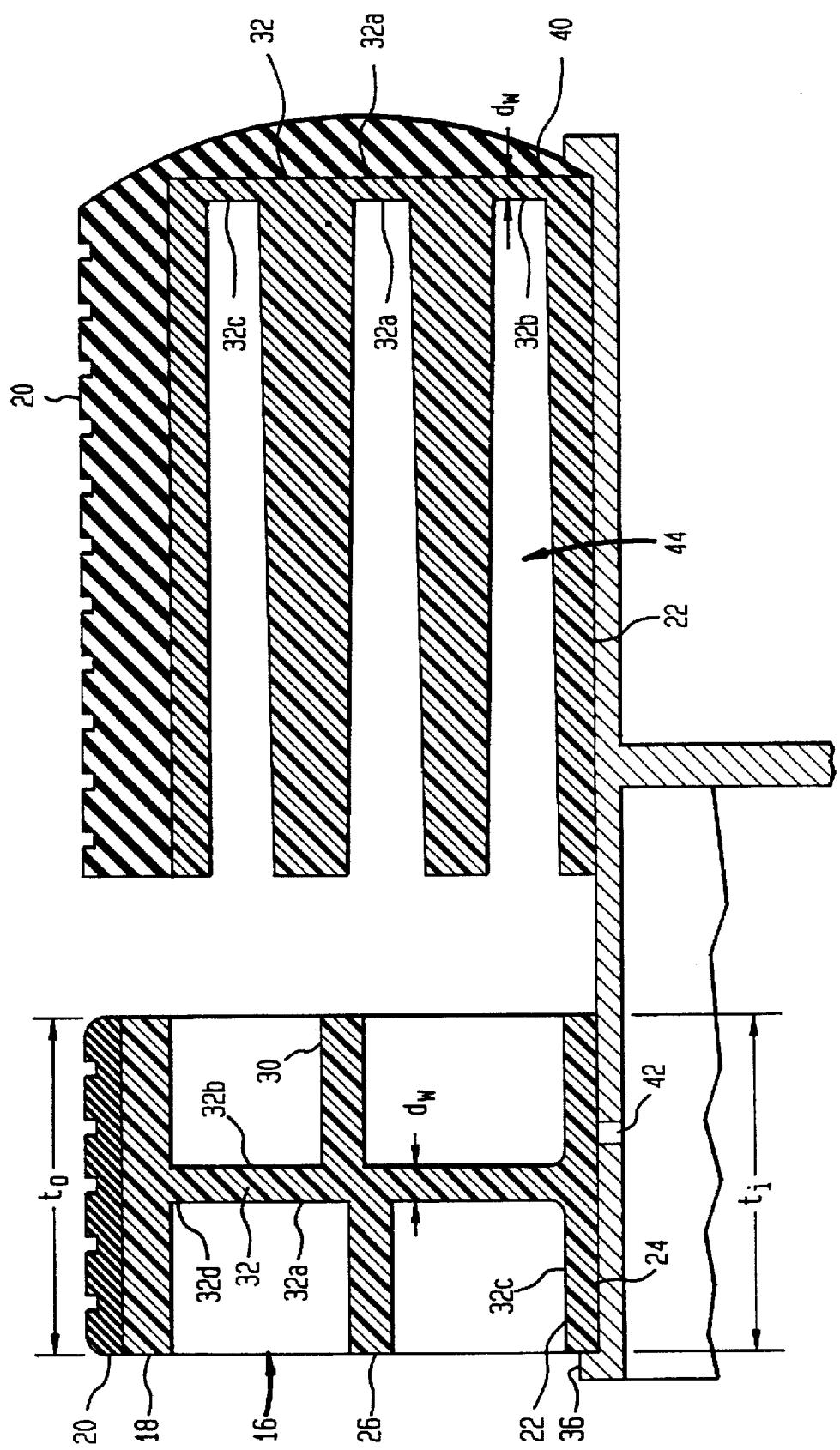
FIG. 6 is an end elevational view illustrating a dual MNPT with two NPTs, one of which is a RNPT and the other a SWNPT.

FIG. 6 illustrates a twin MNPT in which the combination used is a RNPT with a SWNPT, it being understood that the separate treads 20 of each NPT are coplanar in the footprint of the MNPT. The SWNPT is provided with a cap to resemble a sidewall and is placed on the outboard side of the wheel rim. Adequate cooling for the SWNPT is provided because of the open space between the two NPTs. This combination provides the opportunity to combine the best characteristics of each NPT for a particular service.

Figure 7:
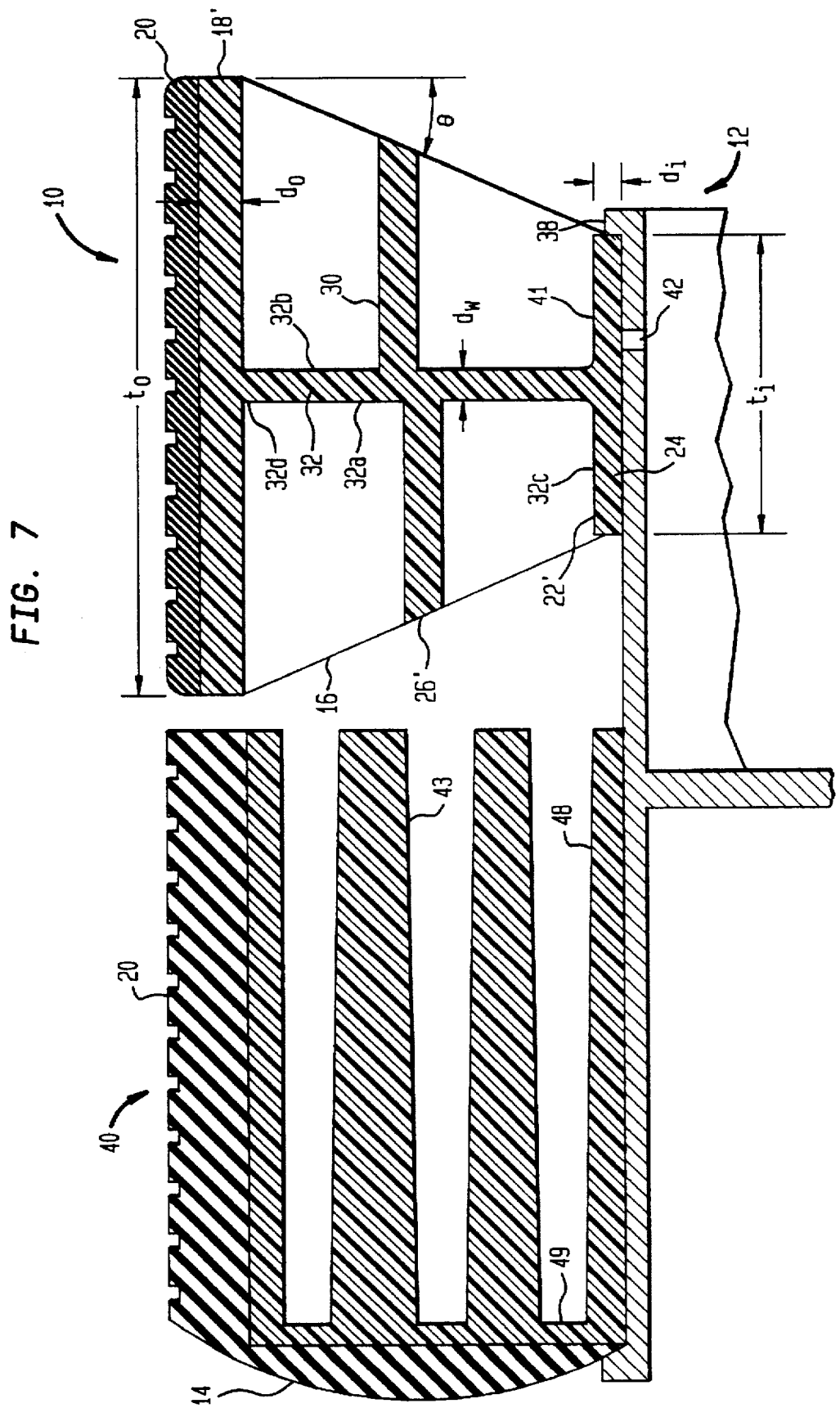
FIG. 7 is an end elevational view illustrating a dual MNPT with two NPTs, one of which is a TNPT and the other a SWNPT.

FIG. 7 illustrates a twin MNPT in which the combination used is a TNPT with a SWNPT, again, it being understood that the separate treads 20 of each NPT are coplanar in the footprint of the MNPT. As in the MNPT shown in FIG. 6, the SWNPT is provided with a cap to resemble a sidewall and is placed on the outboard side of the wheel rim. As before, adequate cooling for the SWNPT is provided because of the open space between the two NPTs. This combination provides the opportunity to substitute the performance characteristics of a TNPT for that of the RNPT in the MNPT of FIG. 6.

Figure 8:
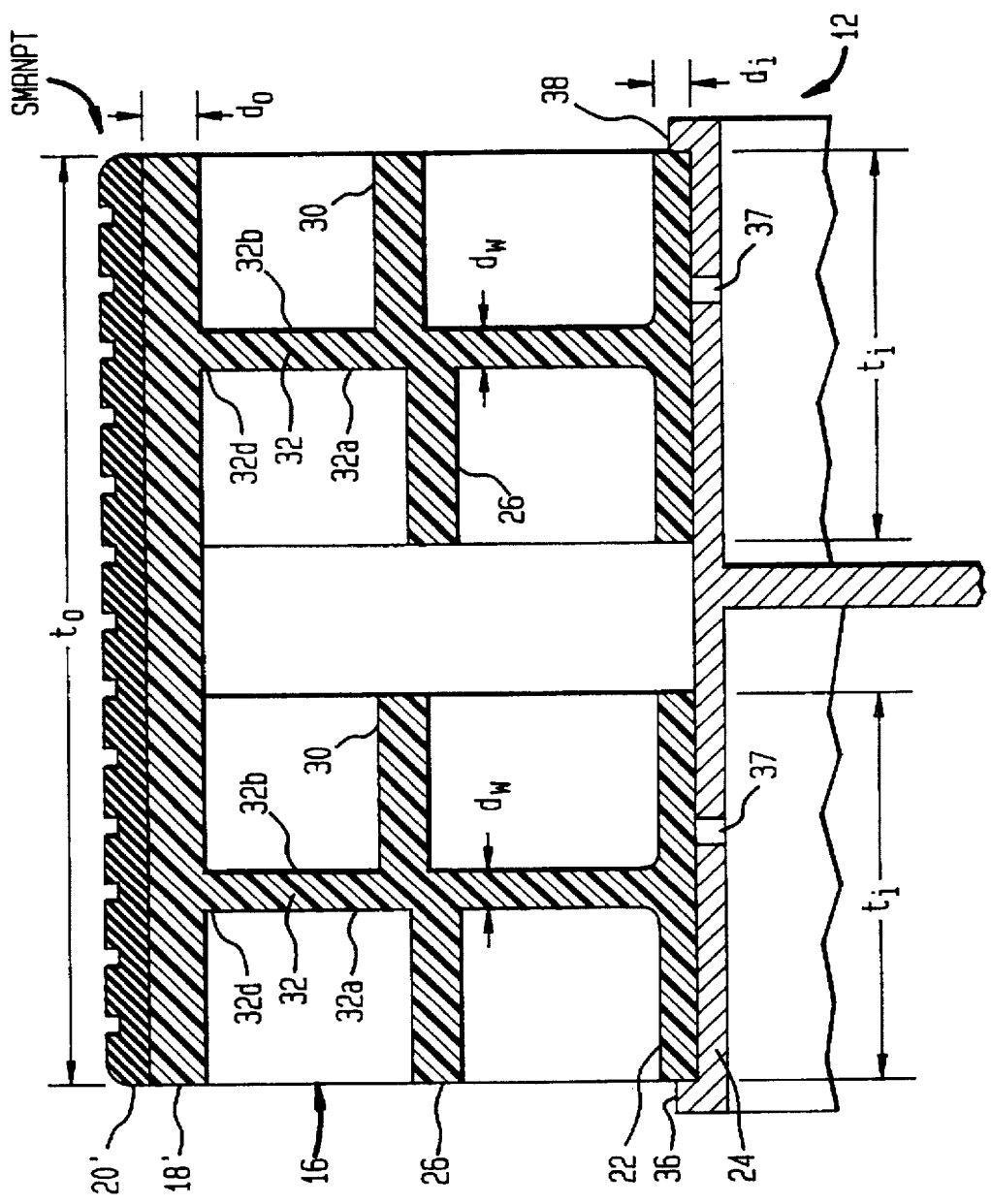
FIG. 8 is an end elevational view of a Siamese TNPT illustrating two TNPTs on a wheel rim, spacing of less than one-half the tread width, but the TNPTs are joined by a common outer hoop and tread. This multiple TNPT cannot be made and post-fitted.

As indicated above and illustrated in FIG. 8, a Siamese MRNPT, indicated generally by the legend SMRNPT, has a longitudinally continuous outer hoop 18' which provides the common outer hoop and surface on which a continuous common tread 20' is bonded. As will be evident, the spacing between the nearest opposed inner edges of adjacent outer hoops may be arbitrarily chosen, since no matter how small, the molding core could not be removed after the outer continuous hoop is formed. For design and performance reasons, however, the spacing is generally no more than one-half the axial width of either outer hoop, but the most preferable spacing is determined by the required duty and service of the SMRNPT. The through-bores 37 are distributed throughout the mold cavity to veto it and dissipate heat build-up.

Figure 9:
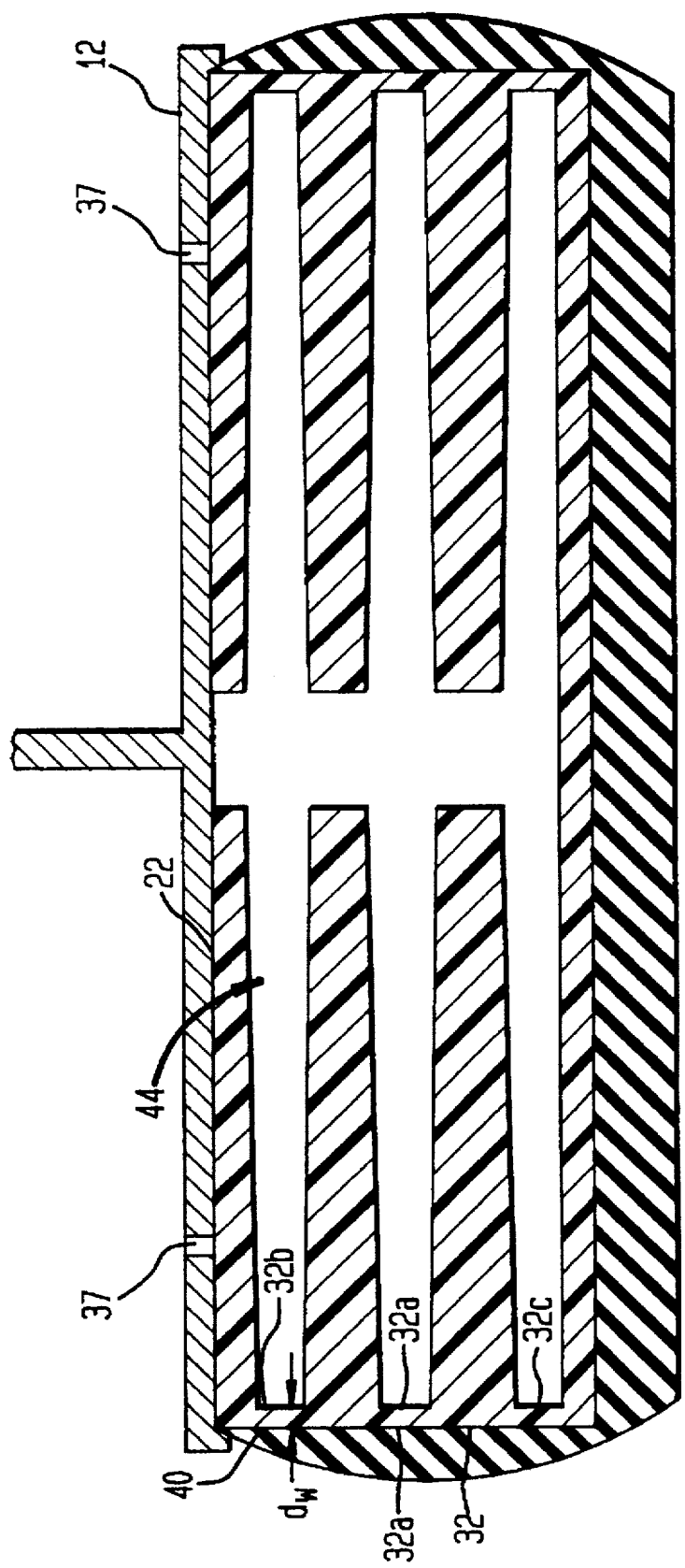
FIG. 9 is an end elevational view of a Siamese SWNPT illustrating two SWNPTs on a wheel rim, with a spacing of less than one-half the tread width, but the SWNPTs are joined by a common outer hoop and tread.
Figure 10:
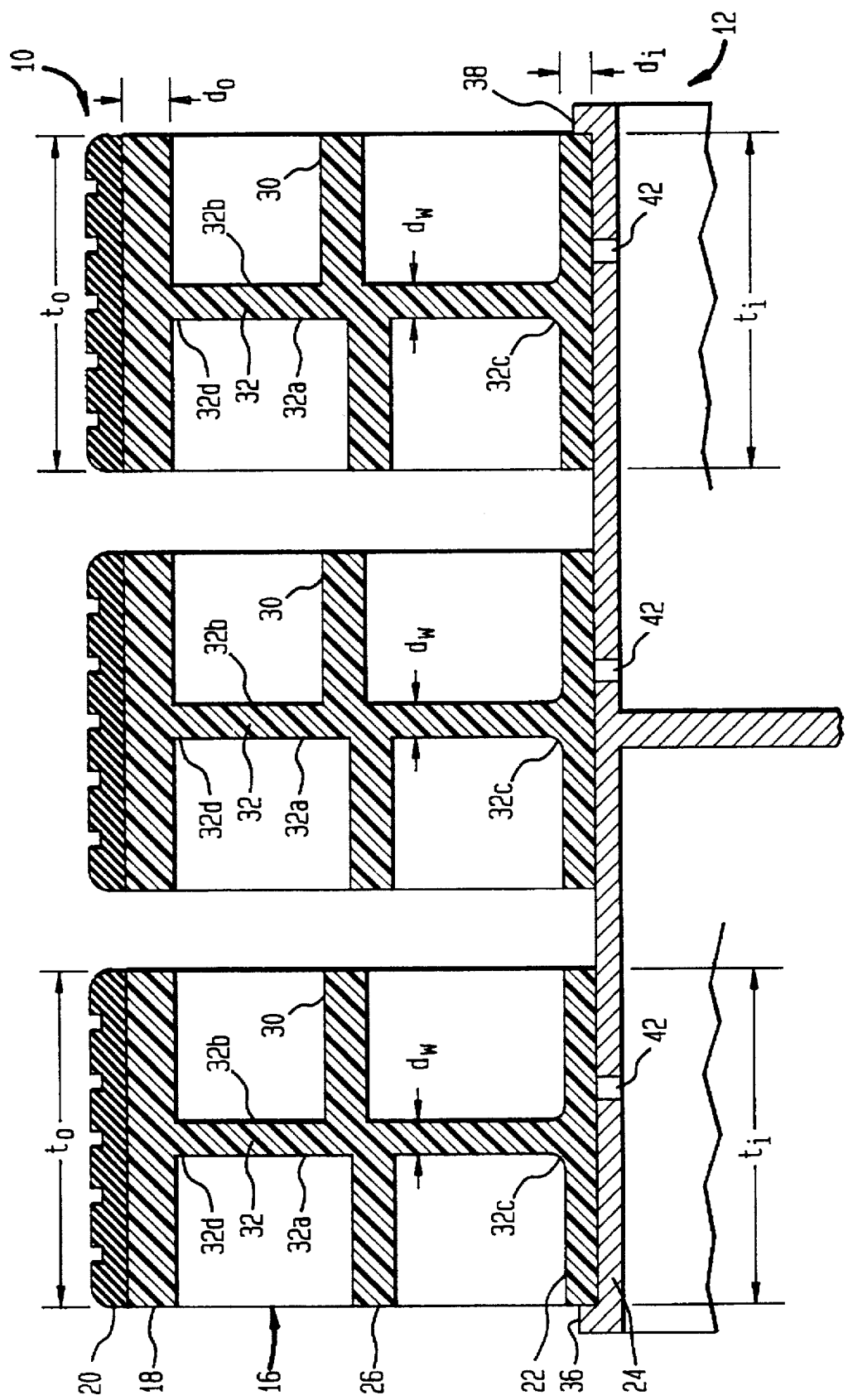
FIG. 10 is a perspective view of a triple MNPT illustrating three TNPTs on a wheel rim, the spacing between one edge of the central NPT and the nearest opposed edge of an adjacent NPT is less than one-half the tread width of either TNPT. Each TNPT is separate, that is, without a common outer hoop. Again, this view looks the same whether integrally formed or post-fitted.

FIG. 9 schematically illustrates a Siamese MSWNPT indicated generally by the legend SMSWNPT, and the continuous outer hoop 48' is covered with a tread 20'. As in FIG. 8, the wheel rim 12 is provided with plural through bores 37 to vent the mold cavity to dissipate heat generated therewithin.

Where an even wider footprint is desired than can be economically provided with a twin MNPT or a Siamese MNPT, it is desirable to provide a triple MNPT such as is illustrated in FIG. 10, with the central RNPT molded symmetrically about the vertical mid-circumferential plane of the wheel, and the remaining two RNPTs molded or otherwise secured on either side of the central RNPT, maintaining the critical requirement of the distance between adjacent NPTs. The unexpected advantage of this design is that it affords extreme load-service so high that it quickly becomes evident that a single NPT to provide the same load-service, could not be economically produced even if the problems of molding such a large NPT could be routinely solved.

Figure 11:
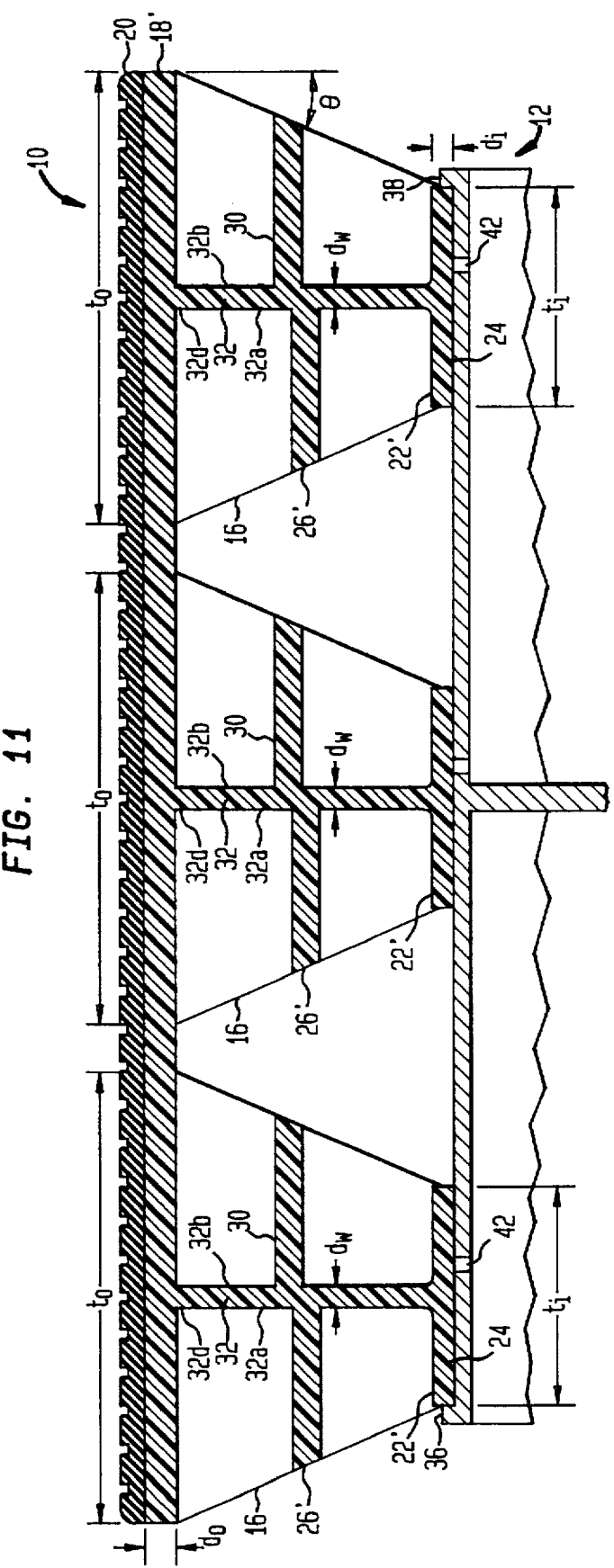
FIG. 11 is a perspective view of a Siamese triple TNPT illustrating three TNPTs on a wheel rim, spacing of less than one-half the tread width, but the TNPTs are joined by a common outer hoop and tread.

FIG. 11 illustrates a triple MNPT analogous to the one shown in FIG. 10 except that the RNPTs are substituted with TNPTs.

In the most preferred embodiment, the construction of the MNPT uses dual NPTs each having an annular body of elastomer having an outer hoop member and an inner hoop member coaxial with the outer hoop. The ribs are preferably undercut at least near their bases (where they join the inner hoop). The entire MNPT is typically molded as a unit directly on a wheel rim after the fugitive core is fixedly located on the wheel rim, and two central elastomeric ride inserts ("RIs") are positioned on the surface of the wheel rim, one on either side of the fugitive spacing core.

Figure 13:
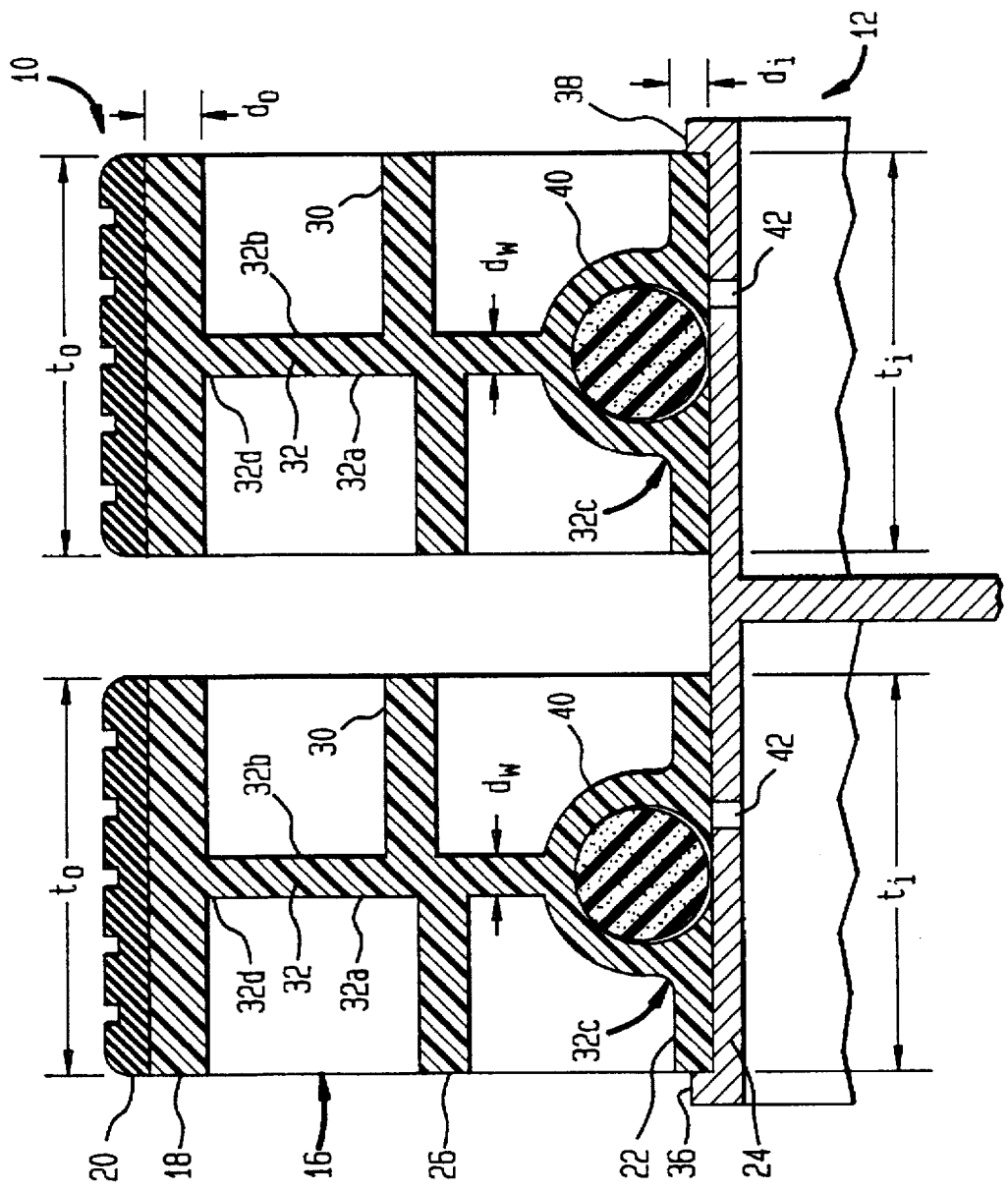
FIG. 13 is an end elevational view illustrating a twin MNPT having two RNPTs on a wheel rim, as in FIG. 2 above, except that each RNPT has a central ride insert captured near the base of the web.
Figure 14:
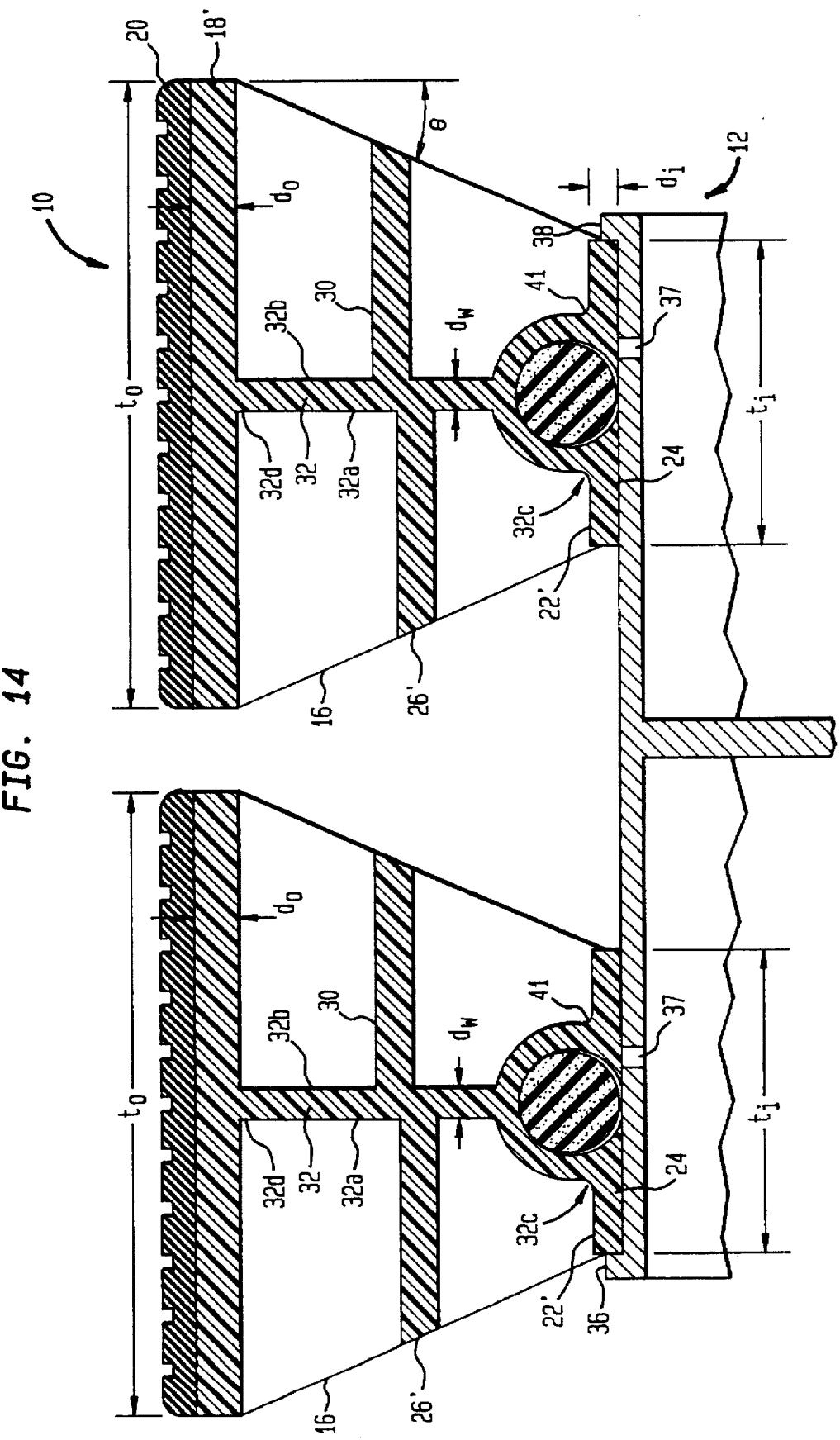
FIG. 14 is an end elevational view illustrating a twin MNPT having two TNPTs on a wheel rim, as in FIG. 3 above, except that each TNPT has a central ride insert captured near the base of the web.

Therefore, in FIGS. 13 and 14, such MNPTs each having central ride inserts, described in the parent case, are illustrated. Such MNPTs are particularly well-suited for use with a vehicle capable of more than about 40 Km/hr, above which speed they provide the most comfortable ride. The embodiment in FIG. 13 is identified as "MRNPT/RI", and that in FIG. 14 is identified as "MTNPT/RI".

In each NPT/RI a central ride insert is captured in the web, at the base thereof, so that the load is distributed around the central insert. It will be understood that other embodiments of the MNPT, whether a MRNPT, MTNPT or a MSWNPT will be cast or otherwise thermoformed in a manner analogous with that described for the MTNPT/RI, irrespective of the distinctive, individual, end-elevational cross-sectional profiles of each NPT in the MNPT.

In each of the foregoing cases, whether formed with an axially continuous or discontinuous outer hoop, a "fugitive sparing core" is used to define a core body having the identical geometry of the cavity, referred to as the 'mold cavity', between adjacent NPTs, to provide the precise dimensions desired, and, to position each NPT on the rim precisely.

Since a fugitive core is to be made of a core material the shape of which must survive the casting conditions of pressure and temperature, two essential requirements of the core material are (i) insolubility in the castable synthetic resin used to make the MNPT, and, (ii) the core's ability to withstand the temperature generated during the exotherm caused by curing of the resin. The insolubility of the core material allows the core material to be removably bonded to the cast resin after it has cooled.

Referring to FIGS. 12A, 12B and 12C there are illustrated spacing cores for a MRNPT, a MTNPT and a MSWNPT respectively, cast on a wheel rim. The spacing core may be directly formed as a ring on the wheel rim, and the ring positioned on the rim. Preferably, each fugitive core 50, 60 and 70 is directly cast on the wheel rim confined in a molding cavity having dimensions corresponding to the spacing core to be formed. If the spacing core is to provide a spacing between opposed nearest edges of adjacent outer hoops, as in the cores illustrated, a fugitive spacer core has a circumferential ridge 51, 61 and 71 respectively, radially projecting from the mid-circumferential portion of the fugitive core. The ridge has a width, longitudinally axially of the ridge, which corresponds to the desired spacing between outer hoops of the MNPT to be cast. Particularly with respect to the core 70, vent stubs 72 are provided which will allow air to pass through the side webs of the SWNPTs to be molded around the core.

Most preferably, through-apertures to serve as air vents to dissipate heat generated during operation of the MNPT, are provided on the wheel rim. To maintain the air vents it is preferred to form the fugitive spacing care on the wheel rim by pouring core material through the vent holes until the cavity for molding the spacing core is filled.

The fugitive spacing core is made from a suitable core material by any conventional technique, and numerous such fugitive cores, preferably as annular bodies are pre-molded on a wheel rim before molding the MNPTS is commenced.

Figure 15:
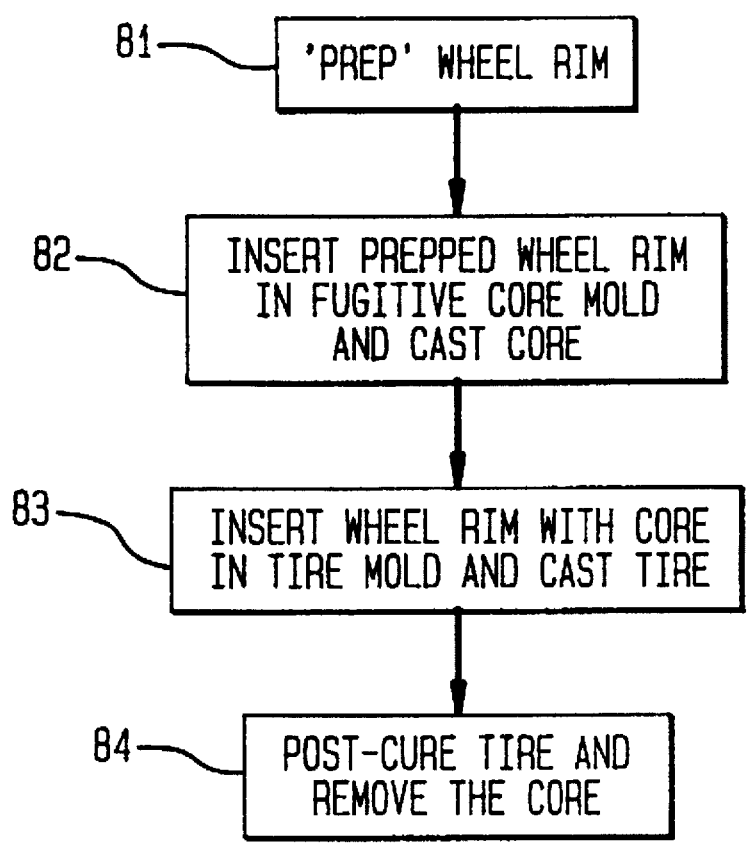
FIG. 15 is a schematic flowsheet illustrating the sequence of operations in the manufacture of a MNPT, and also showing the options available for particular modes of operation chosen for combinations of specific materials.

As illustrated in the flow chart in FIG. 15, the process of making a MNPT is simple, reliable and economical. In the first step designated by reference numeral 81, the wheel rim is "prepped" to accept the fugitive core to be cast on it, in a conventional manner, depending upon the material from which the fugitive core is to be formed. In the following step 82, the prepped wheel is inserted in a mold for the fugitive core to be molded, and the core material, Wood's metal, is cast into the mold cavity, preferably from the through bores provided in the wheel rim, filling the mold cavity to form the fugitive core. Thereafter, in the third step 83, the wheel on which the fugitive core has been cast is positioned in a mold for the MNPT to be made, and the elastomeric resin is introduced into the mold cavity surrounding the fugitive core. When multiple through-passages (holes) 37 are provided in the wheel rim, preferably staggered on either side of the vertical plane, to place the central zone in open communication with the ambient air when the wheel is rotating. The MNPT is most preferably molded by spin-casting using a liquid polyurethane, and the holes 37 are plugged with the fugitive core. The mold heated to 100° C., is filled with a reaction mixture of (a) preblended prepolymer of 1000 and 2000 molecular weight (nominal number average) polytetramethylene ether glycol (PTMEG) with toluene diisocyanate (TDI) to produce a prepolymer having a NCO/OH ratio of about 2:1, available from Uniroyal Corp as Adiprene. The blend of prepolymers is mixed with 4,4'-methylene-bis(2-chloroaniline) ("MBOCA") in an equivalence ratio of prepolymer to MBOCA in the range from about 90 to 110.

The tire mold is removed and the resin is allowed to cure in it over a period of 20 minutes, while another tire mold is placed in position to form the next MNPT. In the fourth step 84, the tire mold is heated to post-cure the resin at a temperature in the range from about 250°–325° F., in which range the Wood's metal is melted and runs out of the passages in the wheel rim. After the MNPT is post-cured in the tire mold, it is allowed to cool to ambient temperature, and the MNPT demolded from the tire mold. A tire tread is then adhesively secured to the outer surface of the NPT/RI.

The type of fugitive material used for the core is not narrowly critical and may be a relatively low melting wax, high melting wax, metal alloy, or, synthetic resin, which can be removed by melting, dissolution, degradation or sublimation, the choice of material depending upon the temperature at which the elastomer is to be cured, and which particular operation is chosen to remove the spacing core. The material of the spacing core is preferably a solvent-soluble material, soluble in a solvent in which the elastomer is essentially insoluble, so that the spacing core may be washed out in the liquid phase, or for speeding up its removal, the core is vapor-dissolved leaving the MNPT. For example, a foam spacing core may be vapor-dissolved with methyl ethyl ketone vapor. Still further, the spacing core may be formed from a frangible organic or inorganic material which may be removed upon making the MNPT, but need not be removed immediately except to improve heat transfer. If not removed, the foam spacing core will self-destruct upon operation of the MNPT. For example the spacing core may be formed from a foamed resin such as polystyrene, preferably foamed in situ with a small bead size and at high pressure to obtain a smooth surface which can be transferred to the molded MNPT.

The core establishes the spacing of adjacent webs, and the spacing, if any, between opposed edges of adjacent outer hoops in a MNPT. When adjacent webs share a common outer hoop, there is no spacing between them; and, even when the outer hoops are separate but about one another, there is essentially no spacing between them. When there is essentially no spacing, there is no radially extending projection on the outer surface of the spacing core. The core material is then removed through apertures in the wheel rim. If the core material is frangible and friable when cool, projecting spikes may be provided both on the surface of the core, and through the wheel rim, the spikes extending beyond the circumference of the outer and inner hoops respectively, between adjacent webs. When the spikes are removed to provide vents in the continuous outer hoop and wheel rim, comminuted core material may be removed through the vents.

Where the spacing between adjacent NPTs is required to define a groove in the axially continuous outer hoop of a Siamese MNPT, such as a groove provided to duct away water during operation of the MNPT, the profile of the groove is determined by the core.

If the core is formed from a frangible and friable core material which survives both curing and post-curing, the MNPT with the core in it, may be then post-cured. Thereafter the post-cured MNPT is demolded and the core in the demolded MNPT may be comminuted by running the wheel under a sufficient load to pulverize the core and form a powder. The powder may either remain trapped in the MNPT, or preferably, is removed from through-apertures or rim-passages in the wheel rim when the powder has small enough particles (that is, is fine enough) to run out of the rim-passages when the multiple NPTs have a common imperforate outer. Alternatively comminution of powder may occur during ordinary use of the MNPT being discharged from between the NPTs when the wheel is in motion.

In the particular instance when the core is made of wax or foamed polystyrene, or low-melting metal alloy, and the polymer is a liquid polyurethane, the polymer is cured while the mold cools. The polymer may then be post-cured at a temperature high enough to melt the wax or metal alloy, or liquefy the polystyrene, causing the core material to flow out of the cured MNPT, through passages in the outer hoop and wheel rim. When the elastomer is a polyurethane, preferred alloys are those which melt below about 150° C., preferably below 120° C., such as binary eutectics of indium and tin, or indium and cadmium; and ternary eutectics containing bismuth as the dominant component, such as Roses's metal and Wood's metal.

A preferred method of casting multiple, closely-spaced NPTs integrally autogenously bonded to the upper surface of wheel rim utilizes an annular core of friable foam referred to as a "foam insert" so shaped as to be matingly fitted between the NPTs, after the NPTs are cast. When liquid elastomer is poured into the mold, the elastomer fills the mold cavity and contacts all the open surfaces of the foam insert. A cross-section of such an annular foam insert between a pair of adjacent RNPTs bonded to a wheel rim, is schematically illustrated in FIG. 10.

The material of the foam insert is preferably a foamed synthetic resinous material such as polystyrene symmetrically disposed about the vertical circumferential center plane, on the wheel rim. The liquid polyurethane, or other liquid casting resin, may then be poured into a conventional mold such as is disclosed in the aforementioned patent references in the conventional manner, and the molded NPTs removed from the molding cavity when cool enough to do so.

The foam polystyrene insert is trapped between the adjacent NPTs. The wheel rim with the two NPTs is mounted on a spindle and rotated against a pair of rollers under pressure sufficient to pulverize the foam which is discharged in small pieces from between the NPTs.

As an alternative the foam may be dissolved with a solvent which is specific to the foamed polystyrene, and the polystyrene recovered for reuse from the solvent. A solution of the polystyrene may be formed with solvent in the liquid phase, or, for greater speed, with solvent in the vapor phase.

Since in a preferred embodiment, the solid elastomeric material of the NPT is formed into a structure comprising a web and interconnecting oppositely directed ribs which cannot bend but must buckle under compressive loads, it is not surprising that the ride does not truly duplicate that of a pneumatic tire, but only mimics the ride. A specific "elastomeric material" is one having a Shore hardness of 60A to 75D, and a compression modulus (at 0.5 shape factor and 10% compression) of 1000 to 50,000 psi, preferably 80A to 53D and a compression modulus of from 3000 to 10000 psi. Preferred materials are polyurethane, polybutadiene, polyisoprenes, ethylene-propylene-non-conjugated diene terpolymer, copolymers of butadiene with acrylonitrile and with methacrylonitrile, styrenes and acrylates. Most preferred elastomer is polyurethane.

The width of the web $d_w$ will depend upon the duty of the NPT, and also the overall dimensions of the NPT designed to serve a specific purpose. For small automobiles weighing about 1000 kg, the web thickness may range from about 2.5–5 mm; and for larger automobiles, light tracks and the like, the web thickness may range from about 4–9 mm.

Figure 12:
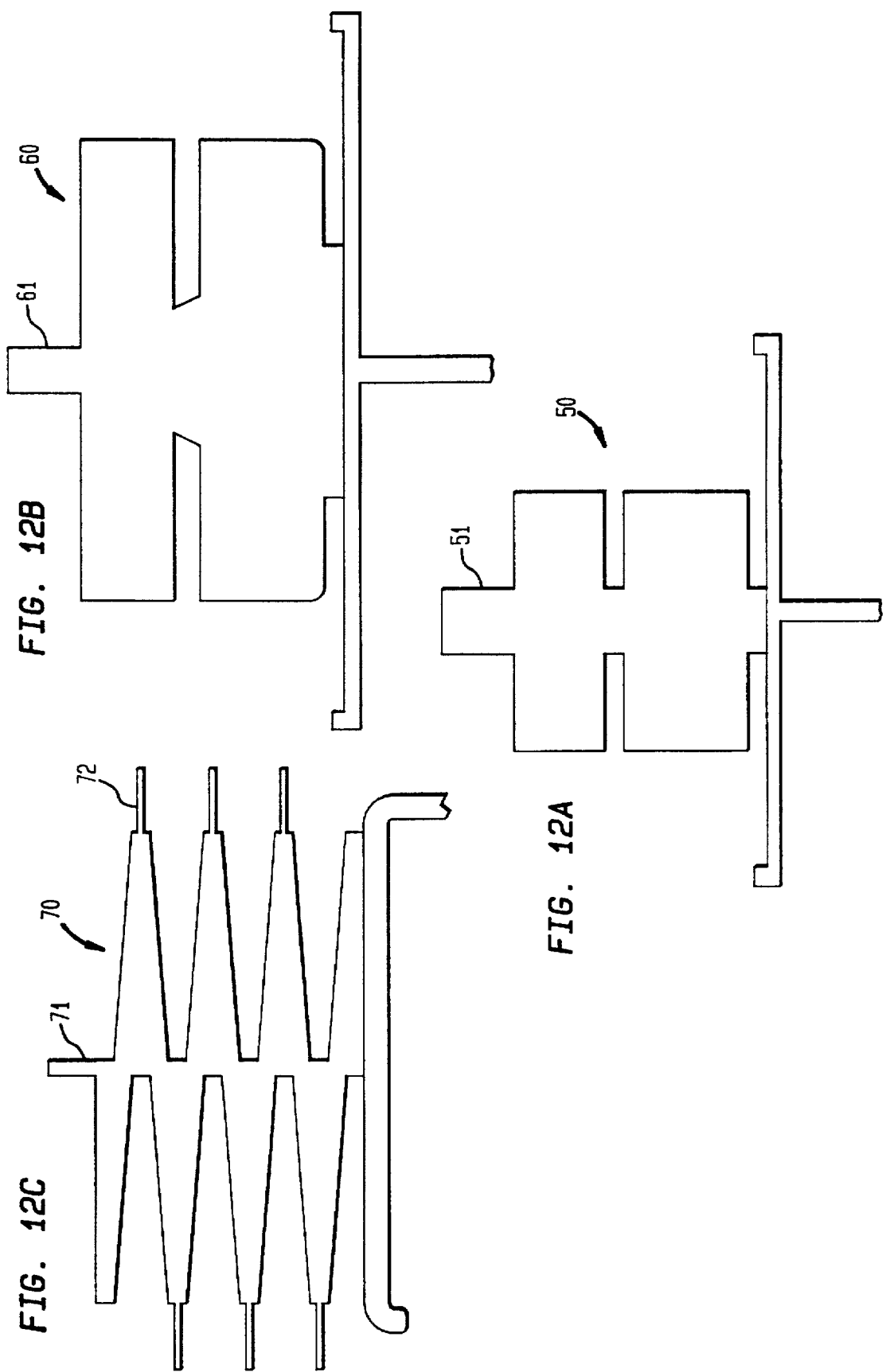
FIGS. 12A, 12B and 12C are cross-sectional end elevation views illustrating annular fugitive inserts such as are used between adjacent RNPTs, TNPTs and SWNPTs respectively, each of which fugitive inserts has angulated fugitive ribs angulated in the same direction, which provide the core portions around and between which the NPT ribs are molded.

As illustrated in FIGS. 12 and 13, a solid ring RI 90 of closed cell polyurethane foam having a bulk density of about 2 lb/ft$^3$ has a diameter greater than $d_w$ and is positioned centrally on the surface 24 of the wheel rim 12. When the TNPT is molded around the RI, the liquid resin flows around the RI and down to the surface 24, encapsulating the RI and forming the inner hoop 22. Simultaneously, ribs 26 and 30 are formed, as is the outer hoop 18 which is of the same length $t_o$ (measured in the longitudinal axial direction) as the length $t_i$ of the inner hoop 22. The wheel rim is provided with projections 36 and 38 to confine the inner hoop 22. When the thickness $d_i$ of the inner hoop 22 is less than the thickness $d_o$ of the outer hoop 18, a TNPT/RI is formed which provides optimum riding qualifies. Upon being cured at a temperature lower than that required to liquefy the foam RI (about its glass transition temperature $T_g$), the formation of the RI-encapsulating base with its arched walls helps absorb sudden large impacts of the RNPT/RI. The tread 20 is preferably of a single strip of vulcanized rubber which is provided with a tread pattern designed to improve the traction, tread wear and noise of the rubber tread.

During operation, the heat generated in the RI zone may generate a high enough temperature to affect the physical condition and therefore the performance of the RNPT/RI, if the zone is not adequately cooled. To this end, through passages 37 are provided in the wheel rim to allow air to be pumped through them into the zone containing the RI, to maintain a desirable temperature in the zone. Such holes 37 may be dispensed with if the base of the web does not completely encapsulate the RI, or if the arcuate wall of the base around an encapsulate RI effectively provides sufficient heat transfer to maintain a temperature below melting point or the $T_g$ of the synthetic resinous material used to make the RNPT. Preferably, whether the RI 90 is a closed cell foam, or a tube with either gas-impermeable walls, or walls which are not; or, whether the RI is fully encapsulated by the base of the web, or only partially encapsulated, it is preferable to provide for additional transfer of heat to the ambient air during operation. Most preferably the closed cell foam is a polyurethane or a polyolefin which is unaffected at the temperature at which the MNPT is cured, and at which the fugitive core is removed.

The effect of the relative diameter of the RI to the width of the web has not been quantified, but it will readily be seen that the beneficial effect of the RI will be very small if its diameter is less than $d_w$, and the stiffening effect of the base of the web may be too great if the diameter approaches the width of the inner hoop.

A range of dimensions (in inches) within which each NPT may be made is set forth in the '098 and '029 patents, but the most preferred set of dimensions for a NPT for use on a conventional 15" wheel rim are provided herebelow:

| Dimension | Minimum | Maximum |
|---|---|---|
| $r_o$ | 9.5 | 10. |
| $\alpha$ | 35° | 45° |
| D | 1.74 | 2.475 |
| $d_i$, $d_o$ | 0.025, 0.1 | 0.06, 0.2 |
| $D/d_w$ | 6.96 | 16.5 |
| $D/d_s$ | 4.97 | 8.54 |
| $t_i$, $t_o$ | 2, 3 | 3, 4 |
| L | 2.124 | 3.5 |
| $L/d_s$ | 12.07 | 6.07 |
| $r_i$ | 7.4 | 7.5 | wherein $r_o$ is the outer radius of the annular body 16, $\alpha$ is the angle the ribs 26 make with the radial planes R, $d_i$ is the radial thickness of the inner hoop $d_o$ is the radial thickness of the outer hoop D is the radial distance from the outer surface of the inner hoop 22 to the inner surface of the outer hoop 18, $d_w$ is the axial thickness of the web, $d_s$ is the thickness of the rib member 26 measured perpendicular to its length L, $t_i$ is the axial thickness of the inner hoop 22, $t_o$ is the axial thickness of the outer hoop 18, and $r_i$ is the radius of the inner surface of the inner hoop 22.

As has been described in greater detail in the aforementioned patents, the NPT/RI is most preferably molded directly onto a wheel rim to get maximum adhesion of the base of the inner hoop to the metal of the wheel rim, particularly if the NPT/RI is to be used on the drive wheels of a vehicle which generates considerable torque. However, in those instances where maximum adhesion is not essential, an NPT/RI may be molded onto a collapsible mandrel and removed as an annular body. The annular body may then be post-fitted to a wheel rim, preferably by first applying an adhesive to bond the NPT/RI to the wheel rim, for use in vehicles which are not provided with a high-torque drive means.

Preferably the ride-insert is positioned on the rim and the NPT cast around the RI which in turn is positioned accurately in the central plane of the mold, so that the RI is locked into position and integrally secured in the NPT before the fugitive core is cast.

In the process steps described hereinabove, it will accordingly be necessary to provide an initial step, prior to inserting the prepped wheel into the mold for the fugitive core, in which initial step the RI is positioned on the wheel rim.

As stated above, the ring of RI may be formed from a foamed elastomer instead of a solid elastomer and a RI which is permeable to air is preferred; or, the ring may be formed with rubber tubing which is spliced together at its ends and fitted over the rim. The RI is made of material which will not melt at the temperature of the liquid polymer poured into the mold, or dissolve in the polymer. In the best mode, the polymer is a mixture of a polyether glycol prepolymer end-capped with isocyanate groups and an aromatic diamine catalyst, and the ride-insert is a hollow tube of elastomer, typically natural rubber or a polyolefin, having a melting point higher than the temperature of the polymer mixture.

Illustrative examples for spin casting a NPT/RI are provided in the parent case. The same technique is adapted for casting the MTNPT/RI.

Having thus provided a general discussion of the NPT/RI, described the overall process of making it in detail, and illustrated the invention with specific examples of the best mode of making the NPT/RI it will be evident that the invention has provided an effective solution to the problem of ameliorating the relatively harsh ride of a web-supported NPT. It is therefore to be understood that no undue restrictions are to be imposed by reason of the specific embodiments illustrated and discussed, except as provided by the following claims.

I claim:

1. A method for forming a tire and wheel rim assembly of multiple non-pneumatic tires on an outer surface of a wheel rim rotatable about an axis, comprising, casting a curable liquid polymer into a mold having an internal cavity bounded by an outer molding member having an arcuate surface having a radius equal to that of an annular outer body to be formed, said cavity shaped to form at least two of said annular bodies, a first body axially spaced apart in side-by-side relationship with a second body, at a critical longitudinal spacing relative to each other, each body having a central unitary circumferential web member, and crossed fibs, said web member connecting outer and inner hoop members, said web member having a radial plane therethrough said critical spacing being that between the nearest opposed edges of separate adjacent outer hoops, which spacing is no more than one-half the axial width of either outer hoop when said outer hoops are of substantially the same width, and less than one-half the width of a narrower outer hoop when one outer hoop is wider than the other;

positioning a shaped spacing core of fugitive material, said spacing core spacing ribs of said first body from those of said second body, and filling a circumferential cavity bounded at its inner periphery by said wheel rim's outer surface, and at the cavity's outer periphery by an inner wall of said outer mold;

confining said liquid polymer in said cavity around said outer surface; curing said polymer; and, demolding said non-pneumatic tire;

thereby forming multiple separate non-pneumatic tires which may be the same or different, fixedly adjacently disposed on said outer surface at said critical longtudinal spacing.

2. The method of claim 1 wherein, prior to casting said curable liquid polymer, securing a ring of elastomeric material as a ride insert on said outer surface centrally in the circumferential plane thereof, whereby said ride insert is captured between said web member and said outer surface.

3. The method of claim 1 wherein said polymer is a mixture of a polyether glycol prepolymer end-capped with isocyanate groups and a catalyst for curing said prepolymer, and said annular body consists essentially of said outer hoop at the outer periphery thereof, said inner hoop spaced radially inward from and, coaxial with said outer hoop, a plurality of axially extending, circumferentially spaced-apart first and second ribs connected at their corresponding inner and outer ends to said inner and outer hoops, said ribs being generally inclined at substantially equal angles of about 15° to 75° to radial planes which intersect them at their inner ends; said web member has opposite side faces, and its inner and outer peripheries connected respectively to said inner and outer hoops; said web member being connected on one side face to said first rib members and on the other side face to said second rib members, said first ribs being directed oppositely to said second ribs with respect to said radial planes, to form, with said inner and outer hoops and said web member, a load-bearing structure which provides locally loaded members adapted to buckle.

4. The method of claim 2 wherein said polymer is a mixture of a polyether glycol prepolymer end-capped with isocyanate groups and a catalyst for curing said prepolymer, and said annular body consists essentially of said outer hoop at the outer periphery thereof, said inner hoop spaced radially inward from and coaxial with said outer hoop, a plurality of axially extending, circumferentially spaced-apart first and second ribs connected at their corresponding inner and outer ends to said inner and outer hoops, said ribs being generally inclined at substantially equal angles of about 15° to 75° to radial planes which intersect them at their inner ends; said web member has opposite side faces, and its inner and outer peripheries connected respectively to said inner and outer hoops; said web member being connected on one side face to said first rib members and on the other side face to said second rib members, said first ribs being directed oppositely to said second ribs with respect to said radial planes, to form, with said inner and outer hoops and said web member, a load-beating structure which provides locally loaded members adapted to buckle.

5. The method of claim 4 wherein said tide insert is a hollow tube of elastomeric material selected from the group consisting of natural rubber and a synthetic resinous material.

6. The method of claim 5 wherein said ride insert is a closed cell foam selected from the group consisting of a polyurethane and a polyolefin.

* * * * *